(12) United States Patent
Bugaj

(10) Patent No.: US 6,837,343 B1
(45) Date of Patent: Jan. 4, 2005

(54) SHOCK ABSORBER

(76) Inventor: Richard Bugaj, 14 Lorenzo Crescent, Rosemeadow, New South Wales (AU), 2560

( * ) Notice: Subject to any disclaimer, the term of this patent is extended or adjusted under 35 U.S.C. 154(b) by 0 days.

(21) Appl. No.: 09/868,462

(22) PCT Filed: Dec. 17, 1999

(86) PCT No.: PCT/AU99/01127

§ 371 (c)(1),
(2), (4) Date: Aug. 10, 2001

(87) PCT Pub. No.: WO00/37822

PCT Pub. Date: Jun. 29, 2000

(30) Foreign Application Priority Data

Dec. 18, 1998 (AU) .............................................. PP7796
Apr. 19, 1999 (AU) .............................................. PP9839

(51) Int. Cl.⁷ ................................................ F16F 9/26
(52) U.S. Cl. ....................... 188/304; 188/314; 188/318; 267/217; 267/64.25
(58) Field of Search ............................... 188/280, 281, 188/282.1, 284, 297, 303, 304, 305, 313, 314, 316, 317, 318, 3; 267/136, 195, 217, 221, 224, 64.25, 64.26, 64.15; 16/51, 52, 53; 280/124.158, 124.159, 124.16, 124.161

(56) References Cited

U.S. PATENT DOCUMENTS

| | | | | |
|---|---|---|---|---|
| 1,089,002 A | * | 3/1914 | Lyon | 188/318 |
| 1,373,332 A | * | 3/1921 | Ike et al. | 188/304 |
| 2,206,800 A | * | 7/1940 | Armstrong | 188/303 |
| 2,306,481 A | * | 12/1942 | Kirk | 188/303 |
| 2,389,849 A | * | 11/1945 | Gruss | 267/64.25 |
| 2,540,708 A | * | 2/1951 | Bowden et al. | 267/64.25 |
| 2,774,446 A | * | 12/1956 | Bourcier De Carbon | 188/317 |
| 2,946,582 A | | 7/1960 | Martin | |
| 3,744,599 A | * | 7/1973 | Tresch et al. | 188/312 |
| 4,033,566 A | * | 7/1977 | Petersen | 267/136 |
| 4,273,317 A | | 6/1981 | Blee | |
| 4,428,464 A | | 1/1984 | Miura | |
| 4,662,486 A | * | 5/1987 | Stenberg | 188/312 |
| 4,721,322 A | | 1/1988 | Hawkins | |
| 4,858,898 A | * | 8/1989 | Niikura et al. | 267/218 |
| 5,009,451 A | | 4/1991 | Hayashi et al. | |
| 5,096,168 A | | 3/1992 | Takehara et al. | |
| 5,098,120 A | * | 3/1992 | Hayashi et al. | 267/217 |
| 5,337,864 A | | 8/1994 | Sjostrom | |
| 5,360,230 A | * | 11/1994 | Yamada et al. | 188/314 |
| 5,477,947 A | * | 12/1995 | Schalles et al. | 188/314 |

FOREIGN PATENT DOCUMENTS

| | | |
|---|---|---|
| AU | 103557 | 4/1938 |
| AU | 208009 | 7/1956 |
| DE | 43 10 548 A1 | 7/1993 |
| FR | 1073827 | 9/1954 |
| FR | 2 777 058 | 8/1999 |
| GB | 764594 | 12/1956 |
| JP | 61189335 | 8/1986 |
| JP | 9-207538 | 8/1997 |

* cited by examiner

Primary Examiner—Thomas Williams
(74) Attorney, Agent, or Firm—Merchant & Gould, P.C.

(57) ABSTRACT

A shock absorber comprises first and second axially aligned cylinders (11, 21) each having a liquid filled piston chamber (12, 22), an axially displaceable piston (13, 23) received in the piston chamber (12,22), and means (14, 24) for dampening axial displacement of the piston (13,23) through the liquid in the piston chamber (12, 22). A piston rod (1) axially extends between and into the first and second cylinder piston chambers (12, 22). The first and second axial ends (1a, 1b) of the piston rod (1) are connected to the first and second cylinder pistons (13, 23) respectively.

26 Claims, 18 Drawing Sheets

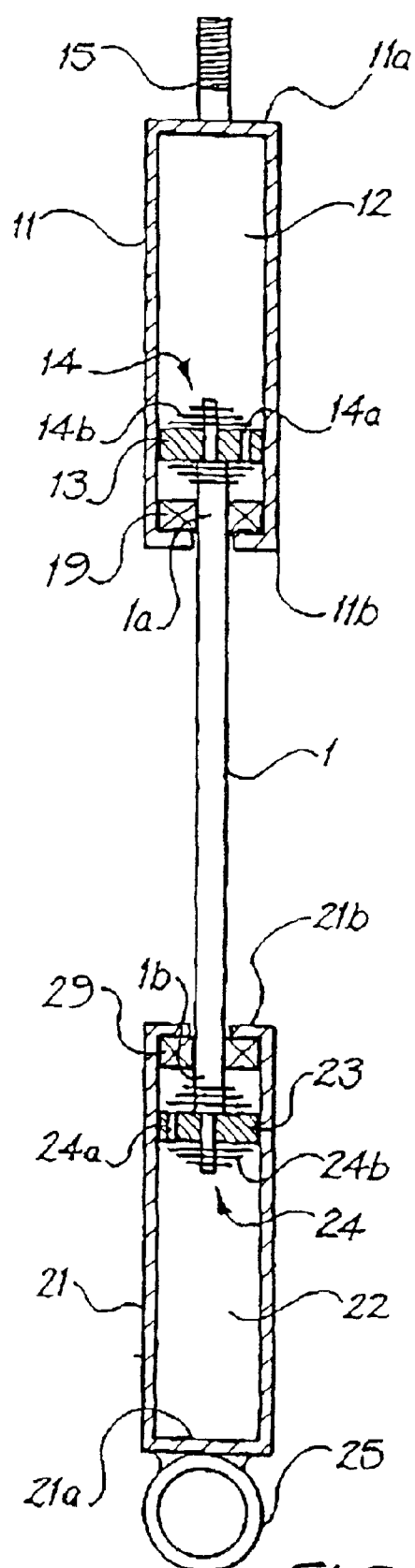
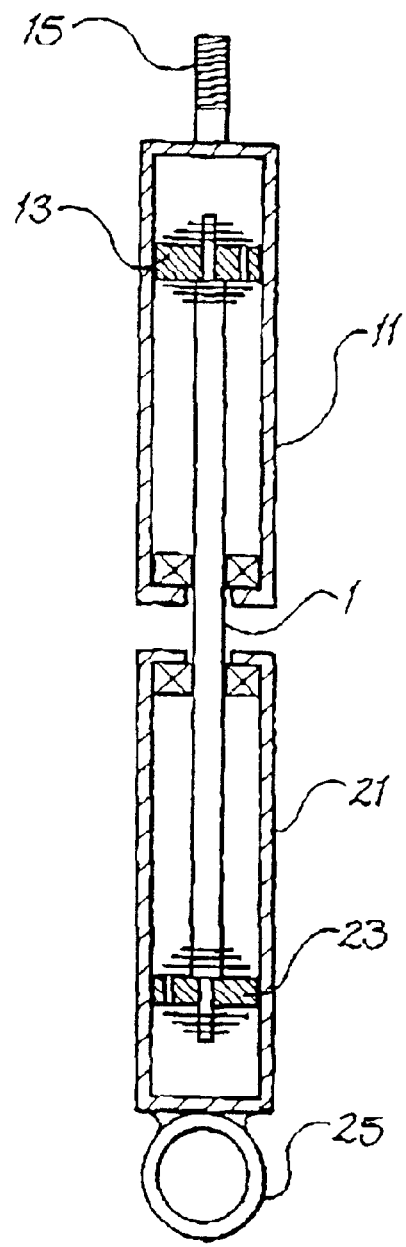
FIG. 1
FIG. 2

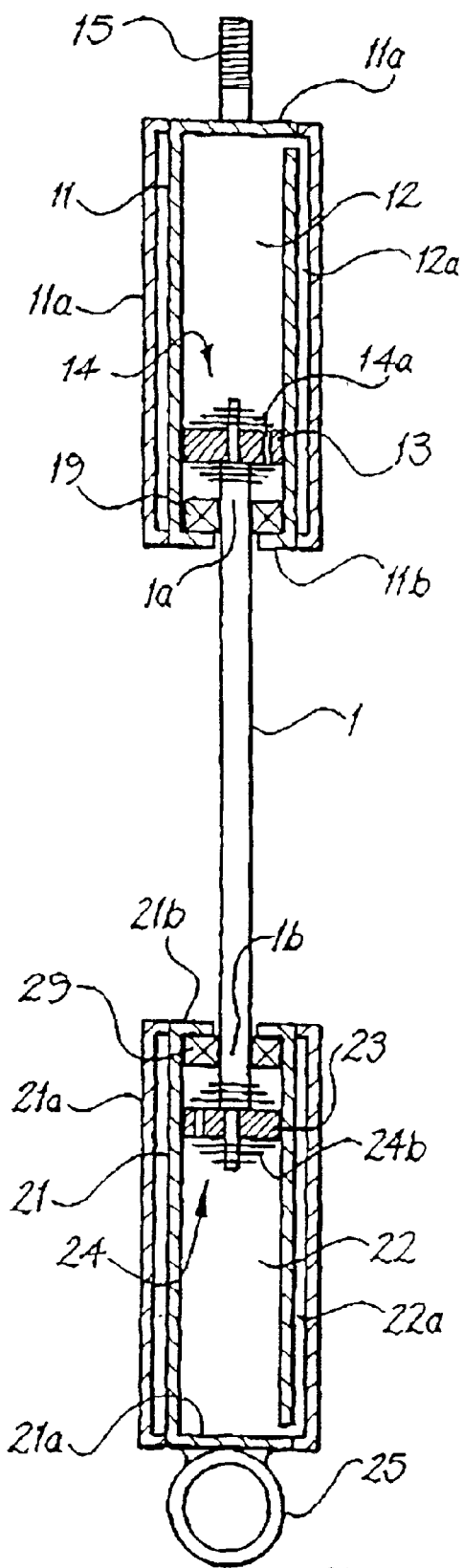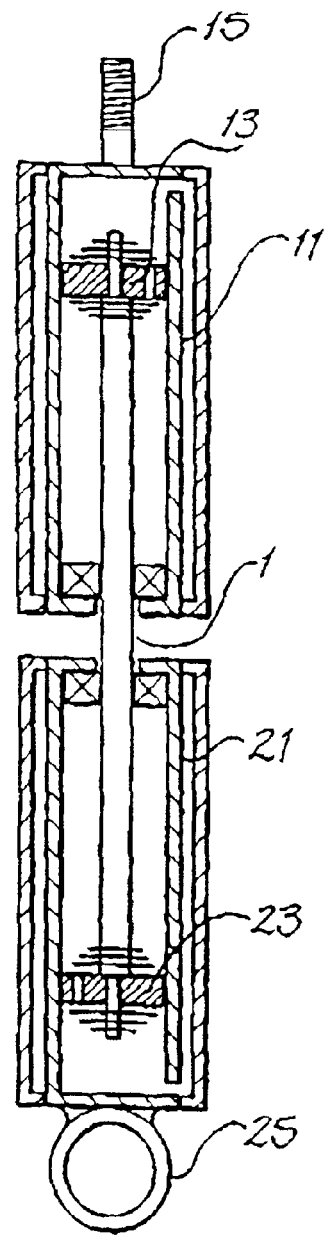
FIG. 1a
FIG. 2a

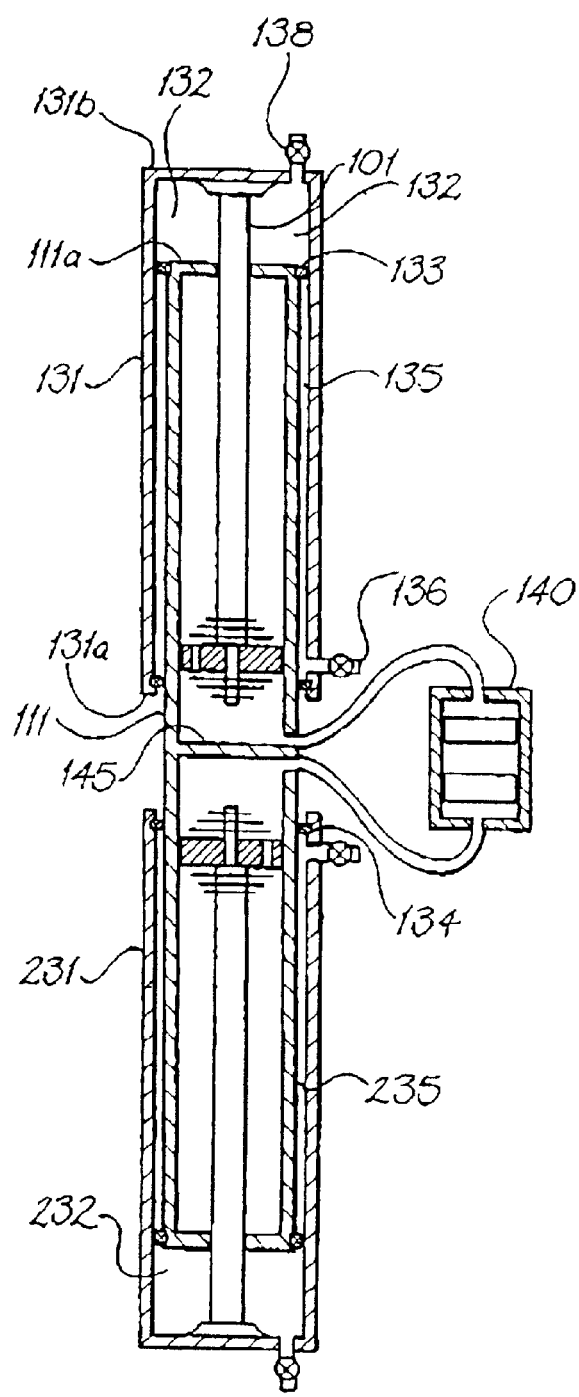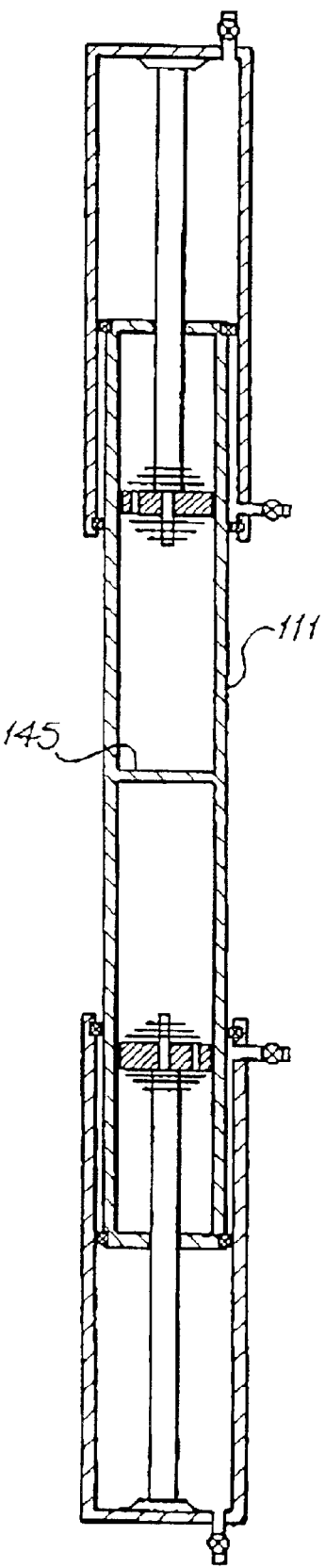
FIG. 12
FIG. 13

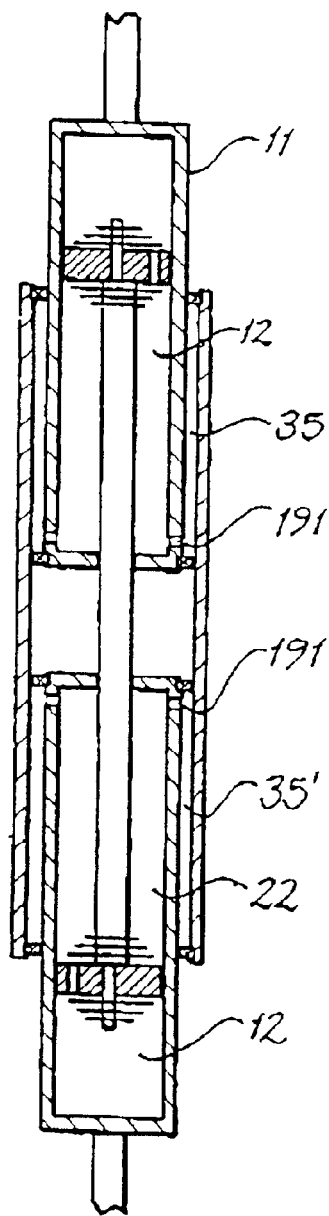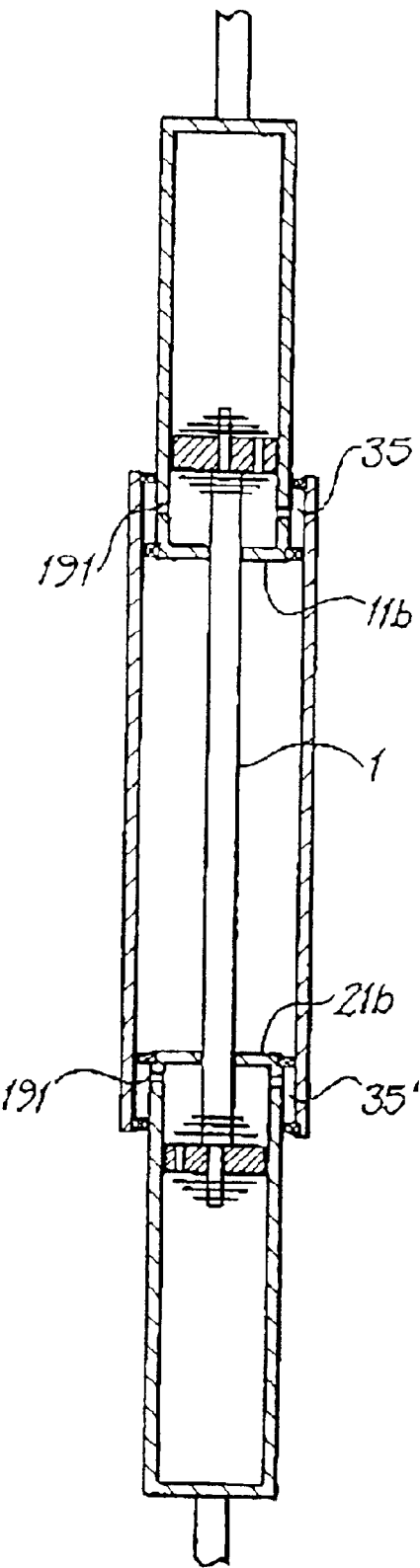
FIG. 23
FIG. 24

SHOCK ABSORBER

TECHNICAL FIELD

The present invention relates to shock absorbers, and in particular relates to, but is not limited to shock absorbers for motor vehicles.

BACKGROUND OF THE INVENTION

Currently available hydraulic vehicle shock absorbers are most typically of the telescopic type in the form of a single piston and cylinder arrangement used in combination with a coil spring over the shock absorber. A piston rod is connected to the piston within the cylinder with its free end protruding from the cylinder for attachment to the body of the vehicle. The cylinder is attached to the vehicle wheel suspension. Extension or compression of the shock absorber, caused when the wheel suspension passes over a rough surface to elastically deform the coil spring, is damped by resistance to movement of the piston within the oil filled cylinder. The damping resistance to movement of the piston is provided by any of various forms of valve mechanism on the piston which restrict flow of the oil from one side of the piston to the other inside the cylinder.

The damping characteristics of the shock absorber can be adjusted to some degree through adjustment of the piston valve mechanism. Gas shock absorbers are also available which have the same basic structure outlined above, but are further provided with a gas chamber toward the end of the cylinder distal from the piston rod and separated from the oil filled chamber by an axially displaceable dividing piston. The gas pressure in the gas chamber can be adjusted to effect the dampening characteristics of the shock absorber.

These forms of currently available shock absorber suffer from various setbacks including limitations in adjustability to provide precise damping over specific ranges of wheel suspension movement amplitude and duration/frequency. The quality of ride provided by such shock absorbers is also typically compromised against vehicle handling performance.

OBJECT OF THE INVENTION

It is the object of the present invention to provide an improved shock absorber.

SUMMARY OF THE INVENTION

There is disclosed herein a shock absorber comprising:

first and second axially aligned cylinders each having a liquid filled piston chamber, an axially displaceable piston received in said piston chamber, and means for dampening axial displacement of said piston through said liquid in said piston chamber, a piston rod axially extending between and into said first and second cylinder piston chambers, first and second axial ends of said piston rod being connected to said first and second cylinder pistons, respectively, and means for securing said first and second cylinders to a body and wheel suspension of a vehicle, respectively.

In one embodiment at least one of said first and second cylinders is provided with a sealed gas chamber at an end thereof distal to said piston rod and preferably a valve means for adjusting gas pressure in said gas chamber, said piston and gas chambers being separated by an axially displaceable dividing piston.

Each of said at least one gas chamber may be disposed externally of the respective said cylinder, said gas chamber being disposed in a separate gas cylinder housing said dividing piston, said piston chamber communicating with said gas cylinder via a conduit at said distal end of said cylinder.

Both said first and second cylinders may be provided with a said sealed gas chamber and a said valve means.

The shock absorber may be provided with first and second coil springs, said first coil spring being associated with said first cylinder and having a first end axially fixed with respect to said piston rod and a second end axially fixed with respect to said first cylinder, said second coil spring being associated with said second cylinder and having a first end axially fixed with respect to said piston rod and a second end axially fixed with respect to said second cylinder.

The coil spring second ends may be fixed to the vehicle chassis and suspension respectively so as to fix their axial positions with respect to the first and second cylinders respectively.

Preferably said first and second coil spring first ends are axially fixed with respect to said piston rod by means of an annular end plate fixed to said piston rod between said first and second cylinders.

Alternatively the shock absorber may be associated with a single coil spring.

Preferably said shock absorber further comprises a sleeve extending between said first and second cylinders, axial ends of said sleeve sealingly engaging said first and second cylinders so as to define a sleeve cavity therebetween, said sleeve being telescopically displaceable with respect to at least one of said first and second cylinders to allow for relative axial displacement of said first and second cylinders. The sleeve may be provided with a valve means for adjusting gas pressure within said cavity.

Preferably said sleeve is axially displaceable with respect to both of said first and second cylinders.

Preferably a first annular cavity is defined in an overlap region between said first cylinder and said sleeve, opposing axial ends of said first annular cavity being respectively defined by a first seal means fixed to said first cylinder and sealingly engaging said sleeve and a second seal means fixed to said sleeve and sealingly engaging said first cylinder.

In one embodiment said first annular cavity communicates with said first piston chamber, a cross sectional area of said first annular cavity measured in a plane perpendicular to the axial direction being substantially equal to a cross sectional area of said piston rod.

Alternatively, the first annular cavity may be provided with a valve means for adjusting gas pressure therein.

Preferably a second annular cavity is defined in an overlap region between said second cylinder and said sleeve, opposing axial ends of said second annular cavity being respectively defined by a first seal means fixed to said second cylinder and sealingly engaging said sleeve and a second seal means fixed to said sleeve and sealingly engaging said second cylinder.

In one embodiment said second annular cavity communicates with said second piston chamber, a cross-sectional area of said second annular cavity measured in a plane perpendicular to the axial direction being substantially equal to a cross sectional area of said piston rod.

Alternatively the second annular cavity may be provided with a valve means for adjusting gas pressure therein.

The shock absorber may be provided with first and second coil springs, said first coil spring being associated with said first cylinder and having a first end axially fixed with respect to said sleeve and a second end axially fixed with respect to said first cylinder, said second coil spring being associated with said second cylinder and having a first end axially fixed with respect to sleeve and a second end axially fixed with respect to said second cylinder.

The coil spring second ends may be fixed to the vehicle chassis and suspension respectively so as to fix their axial positions with respect to the first and second cylinders respectively.

Preferably said first and second coil spring first ends are axially fixed with respect to said sleeve by means of an annular end plate fixed to said sleeve between said first and second cylinders.

Alternatively the shock absorber may be associated with a single coil spring.

In one embodiment the first sealed annular cavity is filled with liquid, said first annular cavity being operatively associated with the sleeve cavity of another second said shock absorber such that a decrease/increase in the volume of said first annular cavity provides an increase/decrease in gas pressure in said sleeve cavity of said another shock absorber.

Preferably said first annular cavity communicates with a first end of a control cylinder and said sleeve cavity of said another shock absorber communicates with a second end of said control cylinder, a control cylinder dividing piston disposed within said control cylinder isolating said first annular cavity and said sleeve cavity of said another shock absorber.

Preferably said control cylinder dividing piston is provided with a piston rod sealingly received in a reduced cross section portion of said control cylinder toward said control cylinder first end such that an extending end of said piston rod isolates said first annular cavity.

Preferably the first annular cavity of said another shock absorber is filled with liquid, said sealed annular cavity of said another shock absorber being operatively associated with the sleeve cavity of said shock absorber such that a decrease/increase in the volume of said first annular cavity of said another shock absorber provides an increase/decrease in gas pressure in said sleeve cavity of said another shock absorber.

There is further disclosed herein a shock absorber comprising:

a cylinder having a liquid filled piston chamber, first and second axially displaceable pistons received in said piston chamber towards first and second respective ends of said cylinder, means for dampening axial displacement of each of said first and second pistons through said liquid in said piston chamber, a first piston rod connected to said first piston and extending through said cylinder first end, a second piston rod connected to said second piston and extending through said cylinder second end, and.

means for securing said first and second piston rods to a body and wheel suspension of a vehicle, respectively.

Preferably said piston chamber is divided into first and second sub-chambers by a sealed gas chamber, said gas chamber being separated from said first and second piston sub-chambers by axially displaceable dividing pistons, said first and second pistons being received in said first and second piston sub-chambers, respectively, said gas chamber being provided with a valve means for adjusting gas pressure in said gas chamber.

Alternately said piston chamber is divided into first and second sub-chambers by a fixed seal, said first and second pistons being received in said first and second piston sub-chambers.

Said first and second sub-chambers may communicate with opposing ends of a gas cylinder via first and second conduits disposed adjacent said fixed seal in said first and second sub-chambers, respectively, said gas cylinder being provided with a gas chamber separated from said first and second conduits by axially displaceable dividing pistons.

The shock absorber may be provided with first and second coil springs, said first coil spring being associated with said first piston rod and having a first end axially fixed with respect to said cylinder and a second end axially fixed with respect to said first piston rod, said second coil spring being associated with said second piston rod and having a first end axially fixed with respect to said cylinder and a second end axially fixed with respect to said second piston rod.

The coil spring second ends may be fixed to the vehicle chassis and suspension respectively so as to fix their axial positions with respect to the first and second piston rods respectively.

Preferably said first and second coil spring first ends are axially fixed with respect to said cylinder by means of an annular end plate fixed to said cylinder.

Alternatively the shock absorber may be associated with a single coil spring.

Preferably said shock absorber further comprises a first sleeve telescopically disposed about and sealingly engaging said cylinder and extending from said cylinder first end, a distal axial end of said first sleeve being sealed such that said first sleeve defines a first sleeve cavity, said first piston rod being fixed in relation to said first sleeve. The first sleeve may be provided with a valve means for adjusting gas pressure within said first sleeve cavity.

Preferably a first annular cavity is defined in an overlap region between said cylinder and said first sleeve, opposing axial ends of said annular cavity being respectively defined by a first seal means fixed to said cylinder and sealingly engaging said first sleeve and a second seal means fixed to said first sleeve and sealingly engaging said cylinder.

In one embodiment said first annular cavity communicates with said first sub-chamber, a cross sectional area of said first annular cavity measured in a plane perpendicular to the axial direction being substantially equal to a cross sectional area of said first piston rod.

Preferably said first annular cavity is provided with a valve means for adjusting gas pressure within said first annular cavity.

Preferably said shock absorber further comprises a second sleeve telescopically disposed about and sealingly engaging said cylinder and extending from said cylinder second end. a distal axial end of said second sleeve being sealed such that said second sleeve defines a second sleeve cavity, said second piston rod being fixed in relation to said second sleeve. The second sleeve may be provided with a valve means for adjusting gas pressure within said second sleeve cavity.

Preferably a second annular cavity is defined in an overlap region between said cylinder and said second sleeve, opposing axial ends of said annular cavity being respectively defined by a first seal means fixed to said cylinder and sealingly engaging said second sleeve and a second seal means fixed to said second sleeve and sealingly engaging said cylinder.

In one embodiment said second annular cavity communicates with said second sub-chamber, a cross sectional area of said second annular cavity measured in a plane perpendicular to the axial direction being substantially equal to a cross sectional area of said first piston rod.

Preferably said second annular cavity is provided with a valve means for adjusting gas pressure therein.

In one embodiment said first annular cavity is filled with liquid, said first annular cavity being operatively associated with the first sleeve cavity of another second said shock absorber such that a decrease in the volume of said first annular cavity provides an increase in gas pressure in said first sleeve cavity of said another shock absorber.

Preferably said first annular cavity communicates with a first end of a control cylinder and said first sleeve cavity of said another shock absorber communicates with a second end of said control cylinder, a control cylinder dividing piston disposed within said control cylinder isolating said first annular cavity and said first sleeve cavity of said another shock absorber.

Preferably said control cylinder dividing piston is provided with a piston rod sealingly received in a reduced cross section portion of said control cylinder toward said control cylinder first end such that an extending end of said piston rod isolates said first annular cavity.

Preferably the fast annular cavity of said another shock absorber is filled with liquid, said first annular cavity of said another shock absorber being operatively associated with the first sleeve cavity of said shock absorber such that a decrease in the volume of said first annular cavity of said another shock absorber provides an increase in gas pressure in said first sleeve cavity of said another shock absorber.

There is further disclosed herein a shock absorber comprising:

a cylinder having a liquid filled piston chamber, an axially displaceable piston received in said piston chamber, means for dampening axial displacement of said piston through said liquid in said piston chamber, a piston rod connected to said piston and extending through a first end of said cylinder, a sleeve telescopically disposed about and sealingly engaging said cylinder and extending from said cylinder first end, a disk axial end of said sleeve being sealed such that said sleeve defines a sealed sleeve cavity, said piston rod being fixed in relation to said sleeve, and means for securing one of said sleeve and said cylinder to a body of a vehicle and the other of said sleeve and said cylinder to a wheel suspension of a vehicle.

The sleeve may be provided with a valve means for adjusting gas pressure within said sleeve cavity.

Preferably an annular cavity is defined in an overlap region between said cylinder and said sleeve, opposing axial ends of said annular cavity being respectively defined by a first seal means fixed to said cylinder and sealingly engaging said sleeve and a second seal means fixed to said sleeve and sealingly engaging said cylinder.

In one embodiment said annular cavity communicates with said piston chamber, a cross sectional area of said annular cavity measured in a plane perpendicular to the axial direction being substantially equal to a cross sectional area of said piston rod.

Preferably said annular cavity is provided with a valve means for adjusting gas pressure therein.

In one embodiment said annular cavity is filled with liquid, said annular cavity being operatively associated with the sleeve cavity of another second said shock absorber such that a decrease/increase in the volume of said annular cavity provides an increase/decrease in gas pressure in said sleeve cavity of said another shock absorber.

Preferably said annular cavity communicates with a first end of a control cylinder and said sleeve cavity of said another shock absorber communicates with a second end of said control cylinder, a control cylinder dividing piston disposed within said control cylinder isolating said annular cavity and said sleeve cavity of said another shock absorber.

Preferably said control cylinder dividing piston is provided with a piston rod sealingly received in a reduced cross section portion of said control cylinder toward said control cylinder first end such that an extending end of said piston rod isolates said annular cavity.

Preferably the annular cavity of said another shock absorber is filled with liquid, said annular cavity of said another shock absorber being operatively associated with the sleeve cavity of said shock absorber such that a decrease in the volume of said annular cavity of said another shock absorber provides an increase in gas pressure in said sleeve cavity of said another shock absorber.

BRIEF DESCRIPTION OF THE DRAWINGS

Preferred forms of the present invention will now be described by way of example with reference to the accompanying drawings wherein:

FIG. 1 is a sectional front elevation view of a shock absorber according to a first embodiment in an extended state.

FIG. 2 is a sectional front elevation view of the shock absorber of FIG. 1 in a compressed state.

FIG. 1a is a sectional front elevation view of a shock absorber according to a version of the first embodiment in an extended state.

FIG. 2a is a sectional front elevation view of the shock absorber of FIG. 1a in a compressed state.

FIG. 12 is a sectional front elevation view of a shock absorber according to a further modified second embodiment in a compressed state.

FIG. 13 is a sectional front elevation view of the shock absorber of FIG. 12 in an extended state.

FIG. 23 is a sectional front elevation view of a modified form of the shock absorber of FIG. 16 in a compressed state.

FIG. 24 is a sectional front elevation view of the shock absorber of FIG. 23 in an extended state.

DETAILED DESCRIPTION OF THE PREFERRED EMBODIMENTS

Figure 3:
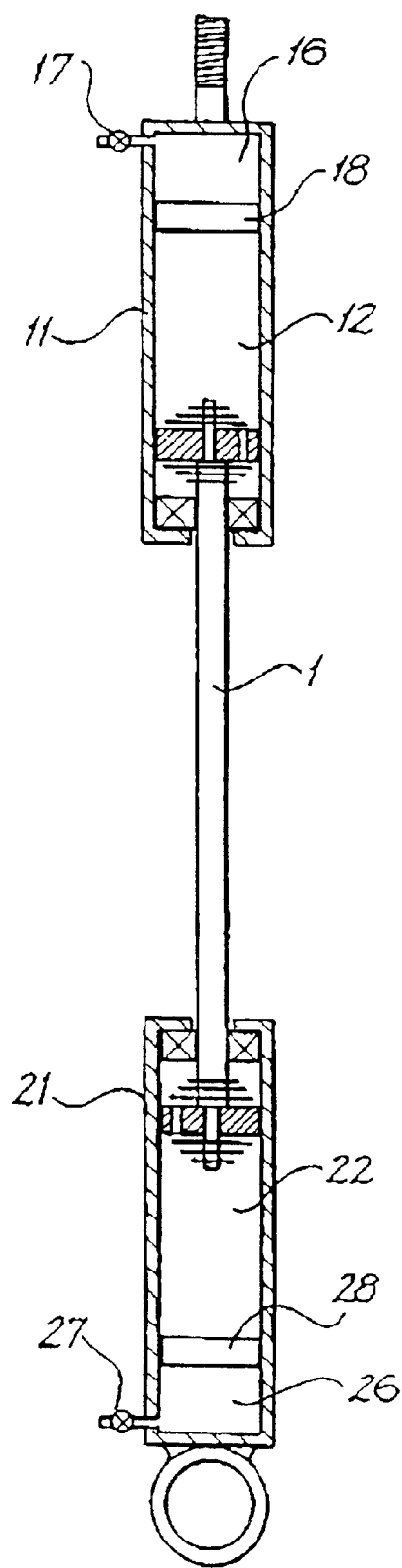
FIG. 3 is a sectional front elevation view of a shock absorber according to a further version of the first embodiment in an extended state.

FIGS. 1 and 2 depict a shock absorber according to a first embodiment in extended and compressed states. The shock absorber is provided with first and second axially aligned cylinders 11, 21. Each of the cylinders is provided with a piston chamber 12, 22 which is filled with oil, hydraulic fluid or any other suitable liquid in the usual manner.

Axially displaceable pistons 13, 23 are received in each of the first and second piston chambers 12, 22, along with means for dampening axial displacement of the pistons 13, 23 through the liquid in the respective piston chambers 12, 22.

The dampening means may take any suitable form as are known in the art. A typical dampening means would be a common valve mechanism 14, 24 on the pistons 13, 23 which comprises one or more apertures 14a, 24b passing through the axial extent of the piston 13, 23 and a series of flexible thin plates 14a, 24a secured to the axial ends of the piston which at least partially cover the aperture(s) 14a, 24a to restrict or block the passage of oil therethrough. Deformation of the plates away from the aperture(s) as a result of liquid pressure enables liquid flow through the apertures.

A piston rod 1 axially extends between the first and second cylinders 11, 21 and into the first and second cylinder piston chambers 12, 22. The first and second axial ends 1a, 1b of the piston rod 1 are connected to the first and second cylinder pistons 14, 24, respectively, in the usual manner.

A threaded rod 15 extends from the upper end 11a of the first cylinder distal to the piston rod 1 for securing the first cylinder to a mounting point on the body of a vehicle (not shown) in the usual manner. Other means for securing the first cylinder could also be utilised as required to suit the specific vehicle. A bearing 25 is formed at the distal or lower end 21a of the second cylinder 21 for securing the second cylinder to the wheel suspension of the vehicle (not shown) in the usual manner. Again the means for securing the second cylinder may be of any form suited to the specific wheel suspension.

The proximal ends 11b, 21b of the cylinders are each provided with an end piece and guide with seal 19, 29 for sealing the end of the pistons chambers at the point of entry of the piston rod 1.

A coil spring can be used with the shock absorber in the usual manner.

The shock absorber according to the first embodiment is thus in the general form of two opposing standard shock absorbers joined by their piston rods. Having two pistons to effect the dampening in a single shock absorber increases the available dampening for a given shock absorber and a reduction by half of the travel of each piston and the piston rod. This provides reduced operating temperatures and pressures and an extended life for the shock absorber. Damping can also effectively be provided for even short duration and low amplitude wheel movements. The twin piston design also enables the shock absorber to dampen from 50% to perhaps 100% higher frequencies than a single piston design. There is also the possibility to increase the total piston area by up to 100% as compared to a single cylinder shock absorber with the same cylinder diameter.

Whilst in a standard single piston shock absorber the moving piston is directly coupled to the vehicle, the described twin piston shock absorber isolate the moving pistons from both the vehicle body and wheel suspension via the oil within the piston chambers. This isolation, and the reduction in displacement amplitude provides improved level of ride comfort to the occupants of the vehicle.

Having two pistons also provides for adjustment of two valve mechanisms, such that increased adjustment to the damping characteristics can be carried out. Further the valve mechanisms of the two pistons can be adjusted to provide individually different characteristics, tuning the shock absorber to two distinct ranges of wheel vibration/displacement. Such twin range tuning could be particularly beneficial for rally cars which may be subject to rough dirt roads and bitumen within one race stage, requiring different shock absorber characteristics. Separate coils of different stiffness could also be used over each cylinder.

As per any standard shock absorber, axial displacement of the pistons 13, 23 within the piston chamber 12, 22 will result in the axial ends 1a, 1b of the piston rod 1 extending into and retracting from the piston chambers 13, 23, varying the available volume of the piston chambers 13, 23 for the liquid therein. This may be compensated for in any of several standard manners, enabling the pistons to axially displace without the incompressible liquid in the piston chamber 13, 23 preventing extension of the piston rod 1 into the piston chamber 13, 23. The most simple manner of providing this compensation is to provide a small pocket of gas at the end of each piston chamber 13, 23, the gas compressing when the piston rod 1 enters the chamber and expanding on withdrawal. This method is not preferred, however, as mixing of the liquid and gas in the piston chamber occurs. A small plastic bag filled with gas can be provided in each piston chamber 13, 23 to compensate for this problem.

A more preferred standard method of compensating is depicted in FIGS. 1a and 2a, based on a standard "twin rube" type shock absorber. An external tube 11a, 21a surrounds each of the piston cylinders 11, 21 and defines an annular compensation cavity 12a, 22a communicating with the piston chamber 12, 22. The annular compensation cavities are each largely filled with gas. Compression of the shock absorber extends the piston rod 1 into the piston chambers 13, 23 and displaces liquid into the annular compensation cavities 12a, 22a, compressing the gas therein in the usual manner.

An alternative gas shock absorber form of the first embodiment, utilising another standard method of compensating for extension of the piston rod 1 into the piston chambers 13, 23, is depicted in FIG. 3. Sealed gas chambers 16, 26 are provided at the distal ends 11a, 21a of the first and second cylinders. Valves 17, 27 may be provided in the usual manner for adjusting gas pressure within the gas chambers 16, 26. The gas chambers 16, 26 are separated from the respective piston chambers 12, 22 by axially displaceable dividing pistons 18, 28 which are free floating and enable the pressure within the gas chamber to be transmitted to the liquid within the piston chambers 12, 22. Rather than both cylinders being provided with the separate gas chamber 16, 26, it is envisaged that only one of the cylinders might have a separate gas chamber 16, 26. It is further envisaged that the gas supply for the gas chambers could be stored externally of the cylinders and communicated with the gas chambers 16, 26 via hose or similar.

Provision of the gas chambers provides the capability for further adjustment of the damping characteristics at each piston and the overall characteristics of the shock absorber.

It will be appreciated by the person skilled in the art that each of the shock absorbers described herein will be provided with any of the standard configurations for enabling axial displacement of the pistons by compensating for extension and retraction of the piston rod(s) into and from the piston chamber(s).

Figure 4:
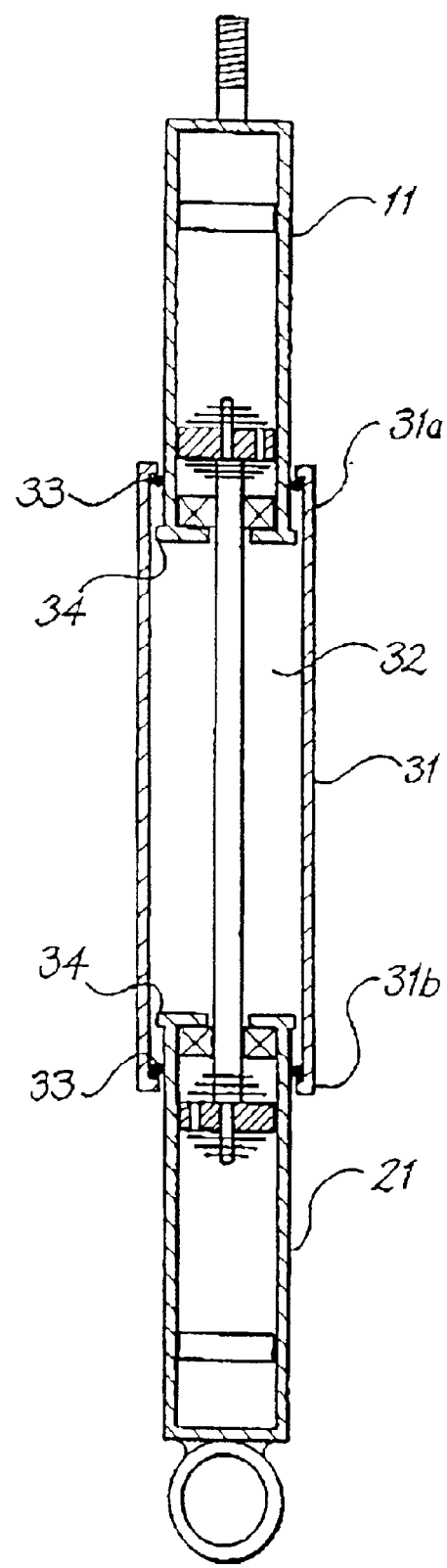
FIG. 4 is a sectional front elevation view of a shock absorber according to a modified first embodiment in an extended state.

A further modification of the first embodiment shock absorber is depicted in FIG. 4. A sleeve 31 is provided which extends between the first and second cylinders 11, 21. Axial ends 31a, 31b of the sleeve 31 sealingly engage the first and second cylinders 11, 21 so as to define a sealed cavity 32 therebetween. The sleeve ends typically sealiugly engage the outer wall of the cylinders via sealing rings 33, 33 which enable the sleeve to be axially displaceable along the outer walls of the cylinders, allowing relative axial displacement of the first and second cylinders 11, 21 during compression and expansion of the shock absorber. It is also envisaged that the sleeve may be fixed to one of the cylinders and axially displaceable with respect to the other so as to still enable expansion and compression of the shock absorber. A detent 34 is provided on each cylinder to ensure the sealing engagement of the sleeve and cylinders is maintained without the sleeve 31 sliding off the end of either cylinder.

Provision of the sleeve 31 improves the lateral stiffness of the shock absorber, and provides further opportunity to adjust the damping characteristics of the shock absorber. Increasing the pressure within the cavity 32 will increases the length of the shock absorber so as to elevate the vehicle if required. The increased pressure will also render the shock absorber harder to compress and easier to extend. A reduced pressure in the cavity will decrease the length of the shock absorber, lowering the vehicle, and making the shock absorber easier to compress and harder to extend.

Figure 5:
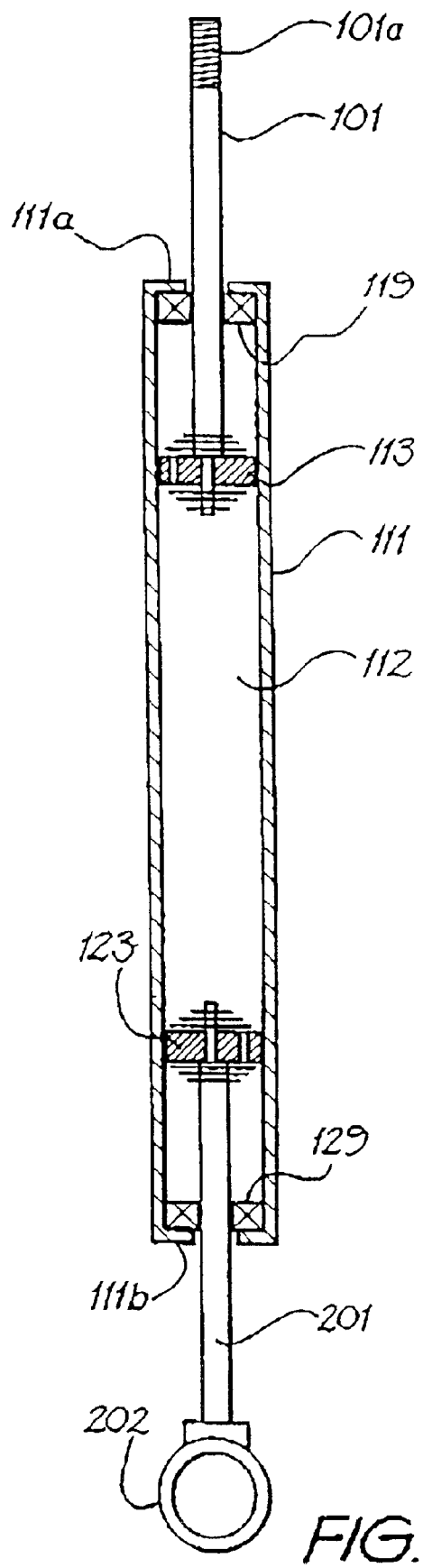
FIG. 5 is a sectional front elevation view of a shock absorber according to a second embodiment in an extended state.
Figure 6:
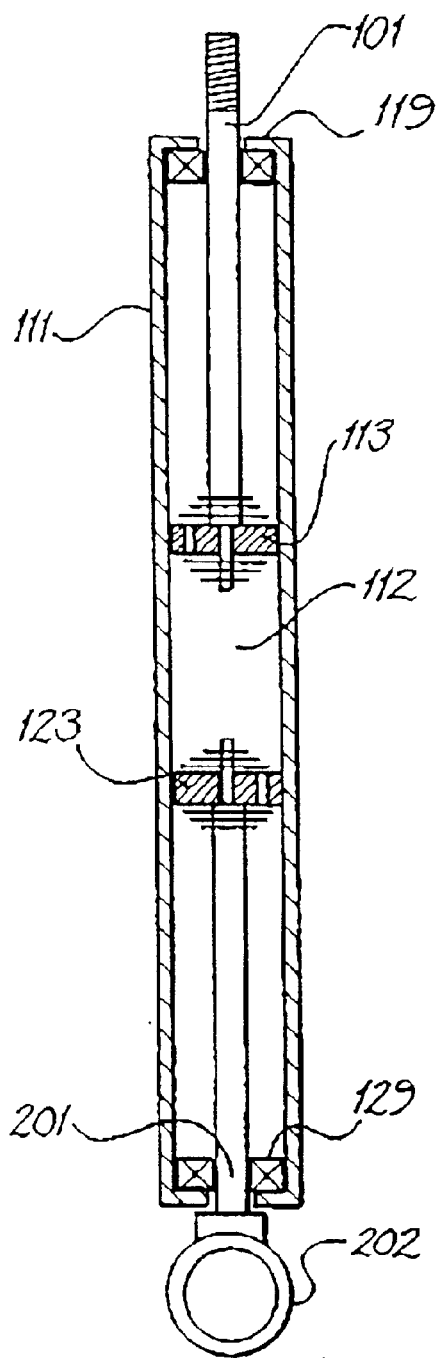
FIG. 6 is a sectional front elevation view of a shock absorber according to a first embodiment in a compressed state.

FIGS. 5 and 6 depict a second embodiment of a shock absorber in extended and retracted states, respectively. The shock absorber comprises a single cylinder 111 with a liquid filled piston chamber 112. First and second axially displaceable pistons 113, 123 are received in the sealed piston chamber 112 towards first and second respective ends 111a, 111b of the cylinder. As per the first embodiment, any of various valve mechanisms 114, 124 or other known means may be provided for dampening axial displacement of each of the first and second pistons 113, 123 through the liquid in the piston chamber 112.

A first piston rod 101 is connected to the first piston 113 and extends through the cylinder first end 111a, whilst an equivalent second piston rod 201 is connected to the second piston 123 and extends through the cylinder second end 111b.

The first piston rod 101 is provided with a threaded portion 101a for securing the first piston rod 101 to a mounting point on the body of a vehicle, whilst the second piston rod 201 is provided with a bearing 202 for securing to the wheel suspension of the vehicle. As per the first embodiment, other forms of attachment may be employed as required.

An end piece and guide with seal 19, 29 is provided at each end of the cylinder 111 as per the first embodiment.

Figure 7:
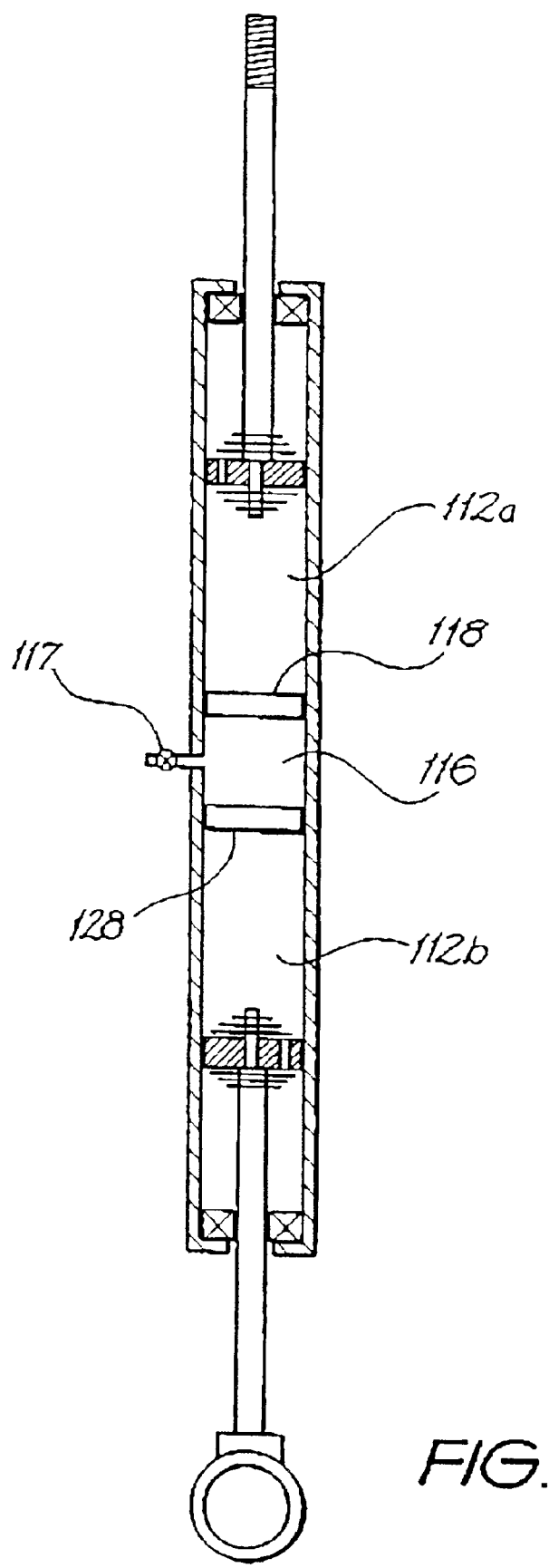
FIG. 7 is a sectional front elevation view of a shock absorber according to a modified embodiment in an extended state.

A modification of the second embodiment is depicted in FIG. 7 which produces a gas shock absorber. The piston chamber is divided into first and second sub-chambers 112a, 112b by a sealed gas chamber 116. The gas chamber 116 is separated from the first and second piston sub-chambers 112a, 112b by axially displaceable dividing pistons 118, 128 in mush the same manner as those of the first embodiment. A valve 117 will typically be provided to enable adjustment of the gas pressure within the gas chamber 116 thereby enabling further adjustment of the damping characteristics of the shock absorber.

As per the first embodiment, both versions of the second embodiment shock absorber increases the available dampening for a given shock absorber and a reduction by half of the travel of each piston and piston rod with the resultant advantages discussed above. Increased opportunity for adjustment and customising the damping characteristics of the shock absorber are also provided through the piston valve mechanisms and the gas chamber (of the FIG. 7 modified embodiment).

Figures 8, 9:
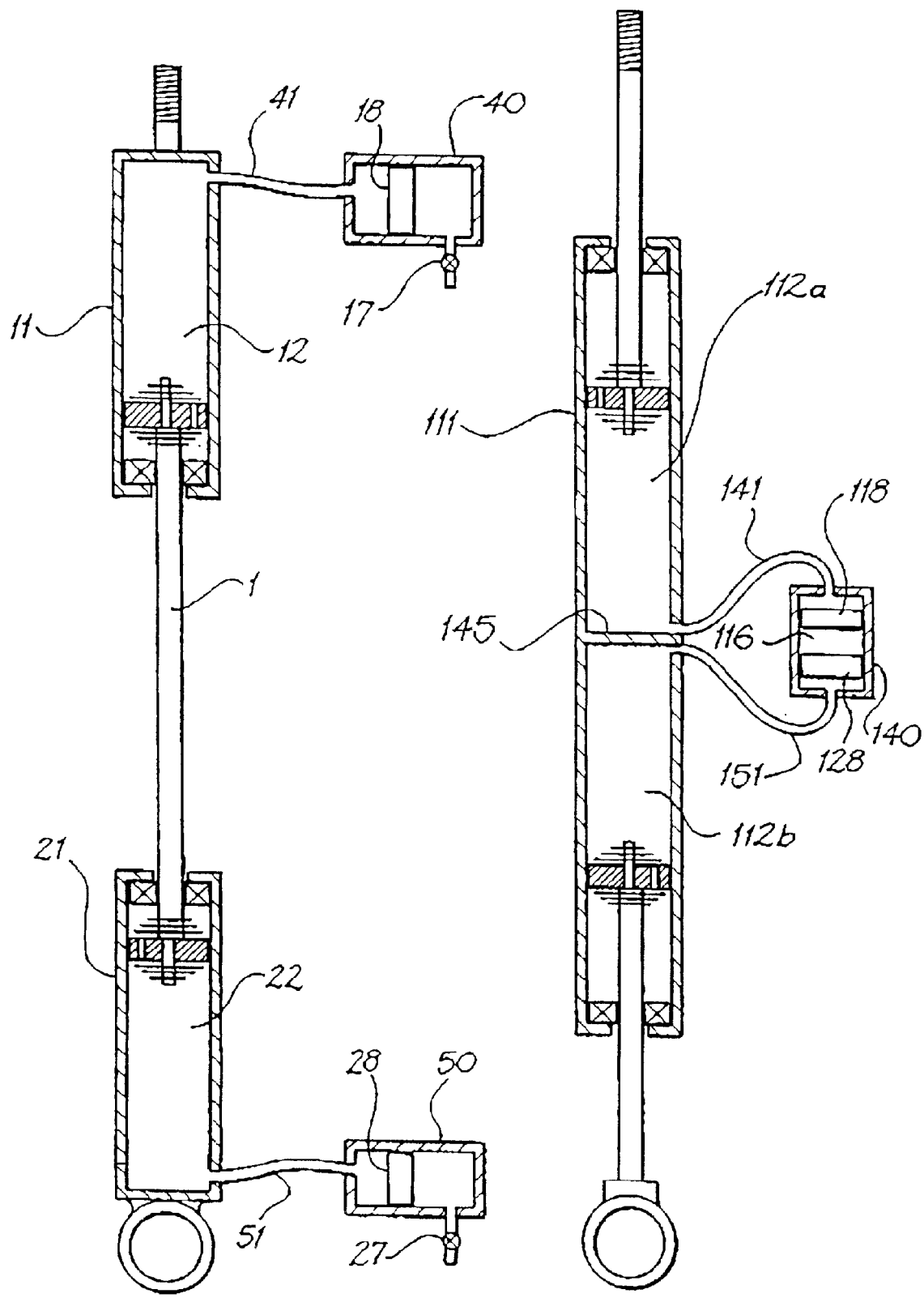
FIG. 8 is a sectional front elevation view of an alternative form of the shock absorber of FIG. 3 in an extended state.
FIG. 9 is a sectional front elevation view of an alternative form of the shock absorber of FIG. 7 in an extended state.

An alternative to the shock absorber of FIG. 3 is depicted in FIG. 8. Rather than providing sealed gas chambers 16, 26 within the first and second cylinders 11, 21, gas chambers 16', 26' may be provided externally of the first and second cylinders 11, 21. The sealed gas chambers 16', 26' are each disposed in a separate gas cylinder 40, 50 housing the dividing piston 18, 28. The piston cbambers 12, 22 communicate with the respective gas cylinder 40, 50 via a conduit 41, 51 at the distal end of the cylinder 11, 21. Such a configuration employing external gas cylinders 40, 50 enables a shorter overall shock absorber length as compared to the shock absorber of FIG. 3.

A similar alternative to the shock absorber of FIG. 7 is depicted in FIG. 9. The piston chamber 112 is divided into first and second sub-chambers 112a, 112b by a fixed seal 145 fixed to the wall of the cylinder 111. The first and second subchambers 112a, 112b communicate with opposing ends of a gas cylinder 140 via first and second conduits 141, 151 adjacent the fixed seal 145. A gas chamber 116 is defined between axially displaceable dividing pistons 118, 128 provided in the gas cylinder 140.

It is also envisaged that the fixed seal 145 could be provided in a shock absorber without any gas chamber (such as the shock absorber of FIGS. 5 and 6). The fixed seal 145 will divide the piston chamber into first and second isolated sub-chambers 112. This will make the shock absorber effectively act as two separate shock absorbers connected end to end with no interaction therebetween. This configuration, whilst providing for separate adjustment of the two ends, will not be as smooth as a shock absorber which leaves the piston chamber as a single chamber (FIGS. 5 and 6) or a shock absorber which separates piston sub-chambers with a gas chamber (FIGS. 7 and 9).

Whilst the various shock absorbers of the present invention may be associated with only a single coil spring as per a standard shock absorber, with the spring top end fixed to the vehicle chassis and lower end fixed to the vehicle suspension, each shock absorber may be provided with two coil springs, one being associated with each end of the shock absorber.

Figure 10:
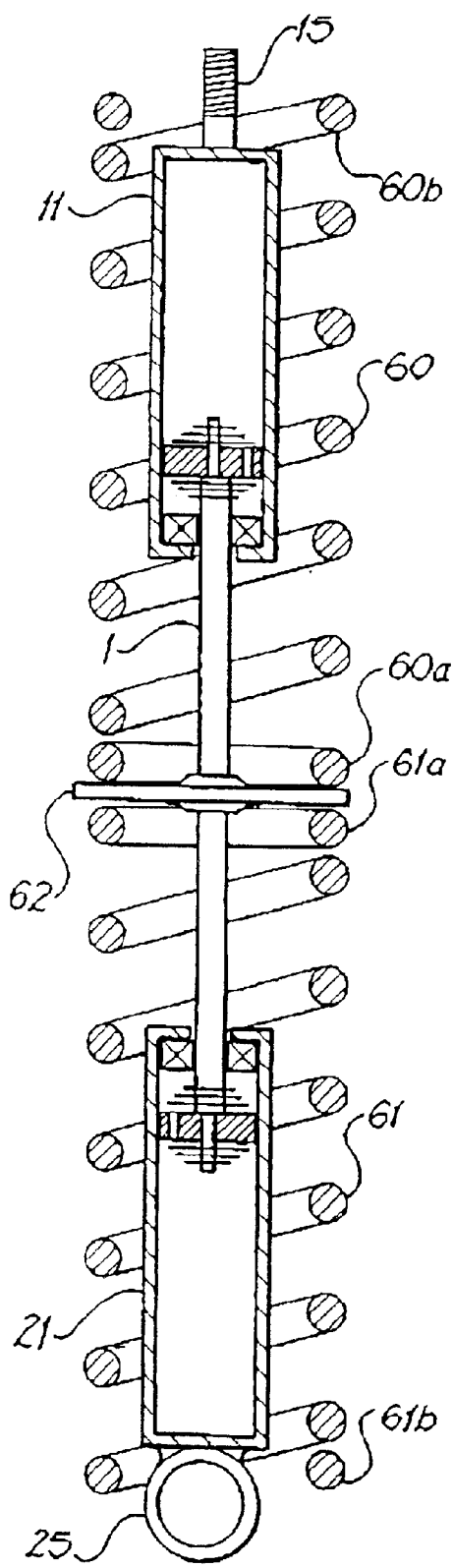
FIG. 10 is a sectional front elevation view of a modified form of the shock absorber of FIG. 1 in an extended state.

The shock absorber of FIG. 1 is depicted with two coil springs 60, 61 in FIGS. 10. A first coil spring 60 is associated with the first cylinder 11, and has a first end 60*a* axially fixed with respect to the piston rod 1. The second end 60*b* of the first coil spring is axially fixed with respect to the first cylinder 11. The coil spring second end 60*b* may either be axially fixed to the first cylinder 11, perhaps by a plate fixed to the first cylinder and abutting the spring end 60*b*, or may be axially fixed to the vehicle chassis/body about the point that the threaded rod 15 is fixed. The second coil spring 61 is associated with the second cylinder 21 and has its first and second ends 61*a*, 61*b* axially fixed in a similar manner. The second coil spring second end 61*b* will typically be fixed to the vehicle suspension. The coil spring first ends 60*a*, 61*a* are preferably axially fixed with respect to the piston rod 1 by means of an annular end plate 62 fixed to the piston rod 1 between the first and second cylinders 11, 21. The coil spring first ends 60*a*, 61*a* abut this annular plate 62 so as to fix their axial location with respect to the piston rod 1. The use of two coil springs in this manner allows the use of a different stiffness springs associated with each of the cylinders 11, 12. A first coil spring 60 of a given stiffness can thus be coupled with the first cylinder 11 with predetermined damping characteristics, and a second coil spring 61 with a different given stiffness coupled with the second cylinder 12 with different damping characteristics.

The shock absorber of FIG. 4 could be modified in a similar way with two coil springs 60, 61, with the plate 62 axially fixing the coil spring first ends 60*a*, 61*a* being fixed to the sleeve 31 rather than the piston rod 1.

Figure 11:
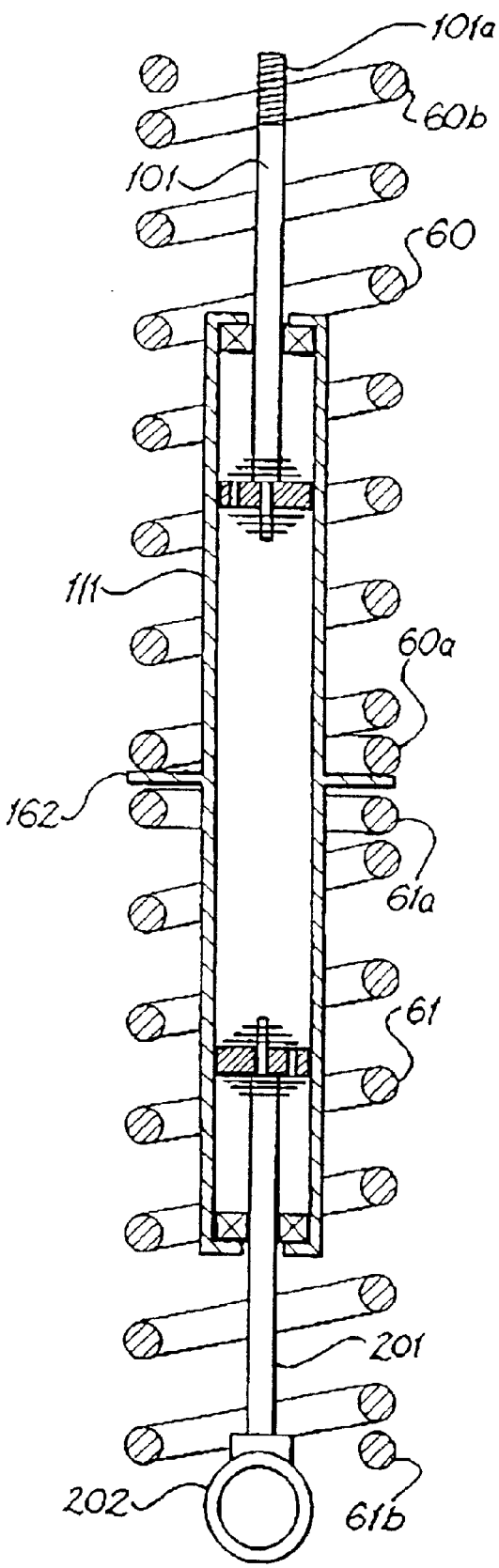
FIG. 11 is a sectional front elevation view of a modified form of the shock absorber of FIG. 5 in an extended state.

The shock absorber of FIG. 5 is depicted with two coil springs 60, 61 in FIG. 11. The first coil spring 60 is associated with the first piston rod 101, and has a first end 60*a* axially fixed with respect to the cylinder 111. The second end 60*b* of the first coil spring is axially fixed with respect to the first piston rod 101. The coil spring second end 60*b* may either be axially fixed to the first piston rod 101, perhaps by a plate fixed to the first piston rod and abutting the spring end 60*b*, or may be axially fixed to the vehicle body about the point that the threaded end 101*a* is fixed. The second coil spring 61 is associated with the second piston rod 201 and has its first and second ends 61*a*, 61*b* axially fixed in a similar manner. The coil spring first ends 60*a*, 61*a* are preferably axially fixed with respect to the cylinder 111 by means of an annular end plate 162 fixed to the cylinder 111. The two coil spring arrangement can be applied in this manner to the shock absorbers of FIGS. 7 and 9.

The twin piston rod, single cylinder shock absorbers of FIGS. 5 through 7, 9 and 11 can be provided with a sleeve or sleeves in a similar manner to the single piston rod, twin cylinder shock absorbers of FIG. 7. Such a modified shock absorber is depicted in FIGS. 12 and 13 in compressed and extended states, respectively.

A first sleeve 131 is telescopically disposed about and sealingly engages she cylinder 111 and extends from the cylinder first end 111*a*. The distal axial end 131*b* of the first sleeve 131 is sealed with an end wall such that the first sleeve 131 defines a sealed first sleeve cavity 132. The first piston rod 101 is fixed to the first sleeve such that axial displacement of the first piston rod 101 will provide an equal displacement of the first sleeve 131 and corresponding change in volume and pressure in the first sleeve cavity 132. A valve 138 will be provided in the first sleeve to enable adjustment of the gas pressure therein. A second sleeve 231 may be similarly mounted on the cylinder second end 111*b*. Extension of the shock absorber, to the state of FIG. 13, will increase the volume and consequently decrease the pressure in the first and second sleeve cavities 132, 232.

Increasing the gas pressure in the first sleeve cavity 132 via the valve 138 will increase the length of the shock absorber and render it harder to compress and easier to extend. The gas pressure in the second sleeve cavity 232 can also be adjusted to further adjust the characteristics of the shock absorber as desired.

Here the first sleeve 131 engages the cylinder 111 in such a manner that a first annular cavity 135 is defined in an overlap region between the first sleeve 131 and the cylinder 111. One axial end of the first sealed annular cavity 135 is defined by a first annular seal 133 which is fixed to the cylinder at its first end 111*a* and sealingly engages the first sleeve. The opposing axial end of the first sealed annular cavity 135 is defined by a second annular seal 134 which is fixed to the first sleeve 131 adjacent the proximal end 131*a* thereof and sealingly engages the cylinder 111. The first annular cavity will typically be provided with a valve 136 for adjusting gas pressure therein. A second sealed annular cavity 235 can similarly be provided at the second sleeve 231.

Provision of the sealed annular cavities 135, 235 provides for further adjustment effecting both the compression and extension (or rebound) strokes. Increasing the pressure in the first sleeve cavity 132 as compared to the first annular cavity 135 will increase the length of the shock absorber and increase the force required to compress the shock absorber whilst decreasing the force to extend the shock absorber. The same effect is achieved by reducing the pressure in the first annular cavity 135. Increasing pressure in the first annular cavity 135, or decreasing the pressure in the first sleeve cavity 132, will shorten the shock absorber. Different adjustments can be made to pressure in the second sleeve cavity 232 and second annular cavity 235 as desired. Additional adjustment opportunities will again be provided if two different stiffness coil springs are used with the shock absorber.

The piston chamber will preferably be separated into first and second piston sub-chambers by a fixed seal 145 and a gas cylinder 140 (as depicted in FIG. 12) may be used to soften the shock absorber response as per the shock absorber of FIG. 9.

Figure 14:
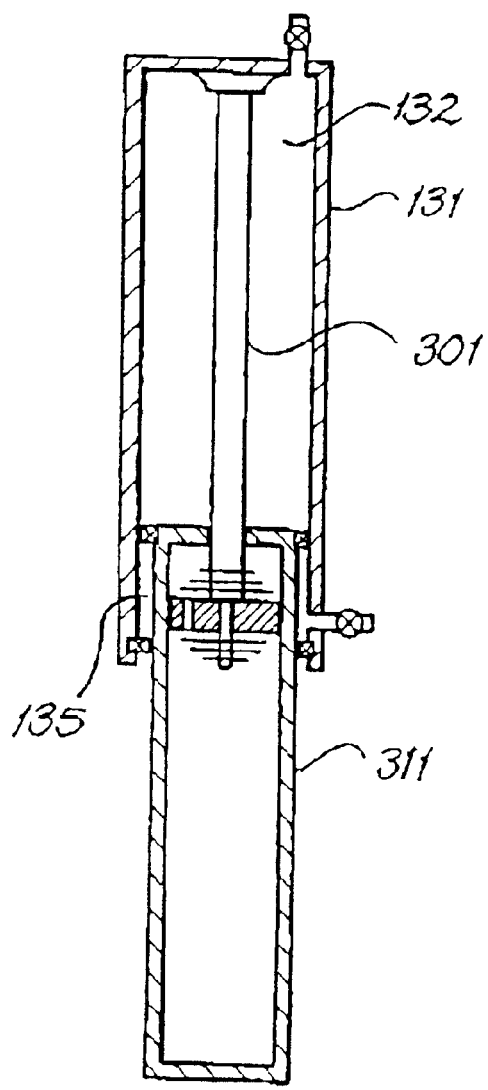
FIG. 14 is a sectional front elevation view of a shock absorber according to a third embodiment in an extended state.
Figure 15:
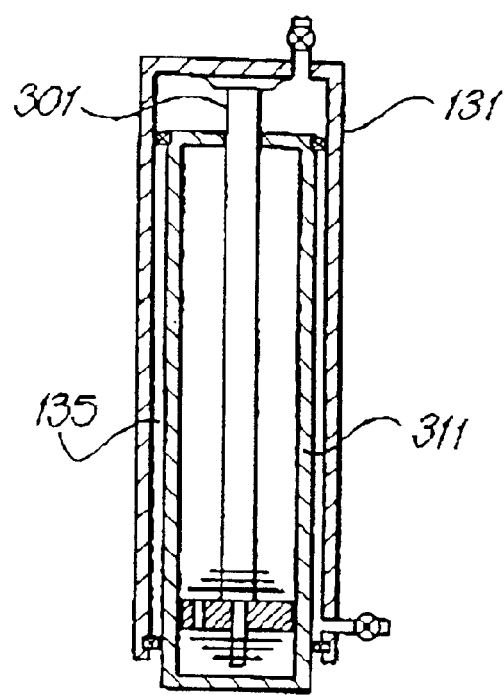
FIG. 15 is a sectional front elevation view of the shock absorber of FIG. 14 in a compressed state.

The use of a sleeve 131 as described above and depicted in FIGS. 12 and 13 can also be employed with a standard single cylinder, single piston shock absorber, as depicted in FIGS. 14 and 15 in the extended and compressed states respectively. The sleeve 131 is mounted on the cylinder 311 in the same manner as either of the sleeves of the shock absorber of FIG. 12, with the single piston rod 301 fixed to the sleeve 131. The sleeve 131 may engage the cylinder 311 so as to provide a sealed annular cavity 135, enabling adjustment of pressure in both the sleeve cavity 132 and the annular cavity 135, or the sleeve 131 may be mounted so as only to provide the sealed sleeve cavity 132.

Figure 16:
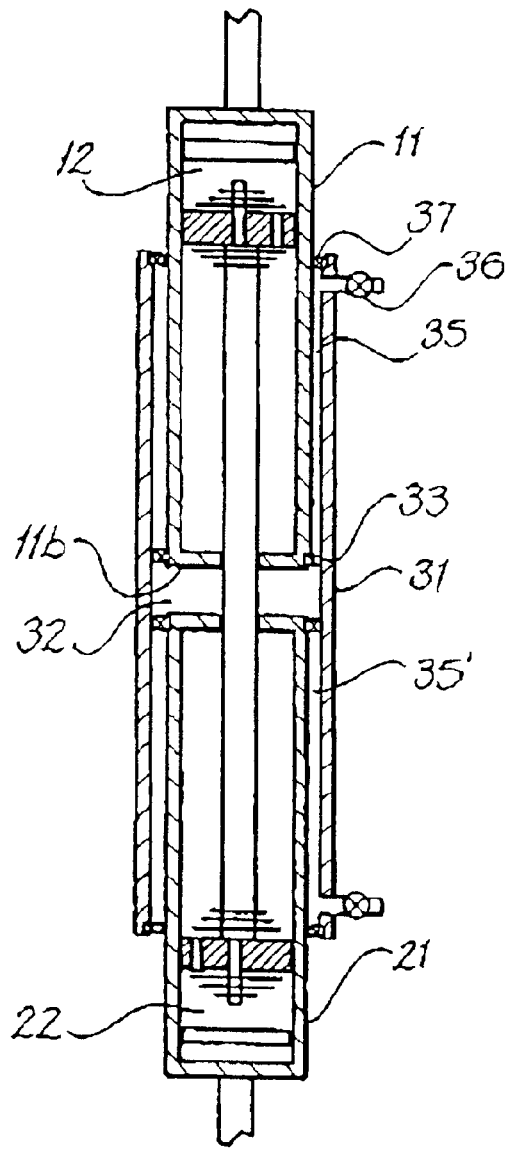
FIG. 16 is a sectional front elevation view of a modified form of the shock absorber of FIG. 7 in a compressed state.
Figure 17:
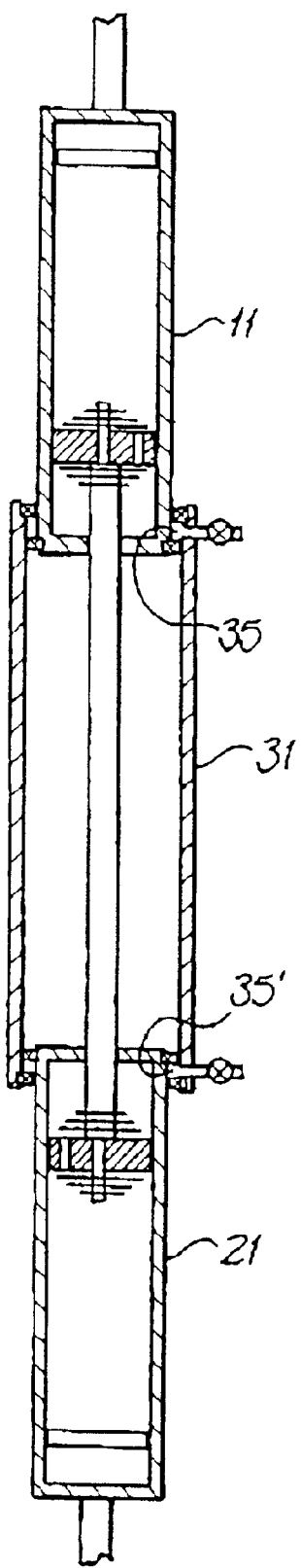
FIG. 17 is a sectional front elevation view of the shock absorber of FIG. 16 in an extended state.

Provision of annular cavities can also be achieved in a similar manner with the two cylinder, single piston rod sleeved shock absorber of FIG. 4. Such a modified shock absorber is depicted in FIGS. 16 and 17 in the compressed and extended states respectively. A first sealed annular cavity 35 is defined in an overlap region between the first cylinder 11 and the sleeve 31. One axial end of the first annular cavity 35 is defined by a first annular seal 33 which is fixed to the first cylinder at its second end 11b and sealingly engages the sleeve 31. The opposing axial end of the first annular cavity 35 is defined by a second annular seal 37 which is fixed to the sleeve at its first end 31a and sealingly engages the first cylinder 11. The first sealed annular cavity 35 is typically provided with a valve 36 for adjusting gas pressure therein. A second sealed annular cavity 35' can be provided at the second cylinder 21 in the same manner.

Again using different pressures in the sleeve cavity 32 as compared to the first and/or second annular cavities 35, 35' provides for adjustment of characteristics of both the compression and extension strokes. Increasing the pressure in the sleeve cavity 32 will extend the shock absorber and can be used to level the vehicle when under heavy load. Increasing the pressure in the sleeve cavity 32 will also increase the force to compress the shock absorber and hence harden the compression stroke. Alternatively, increasing the pressure in the annular cavities 35, 35' will shorten the shock absorber and increase the force to extend the shock absorber, hardening the extension (or rebound) stroke.

Figure 17A:
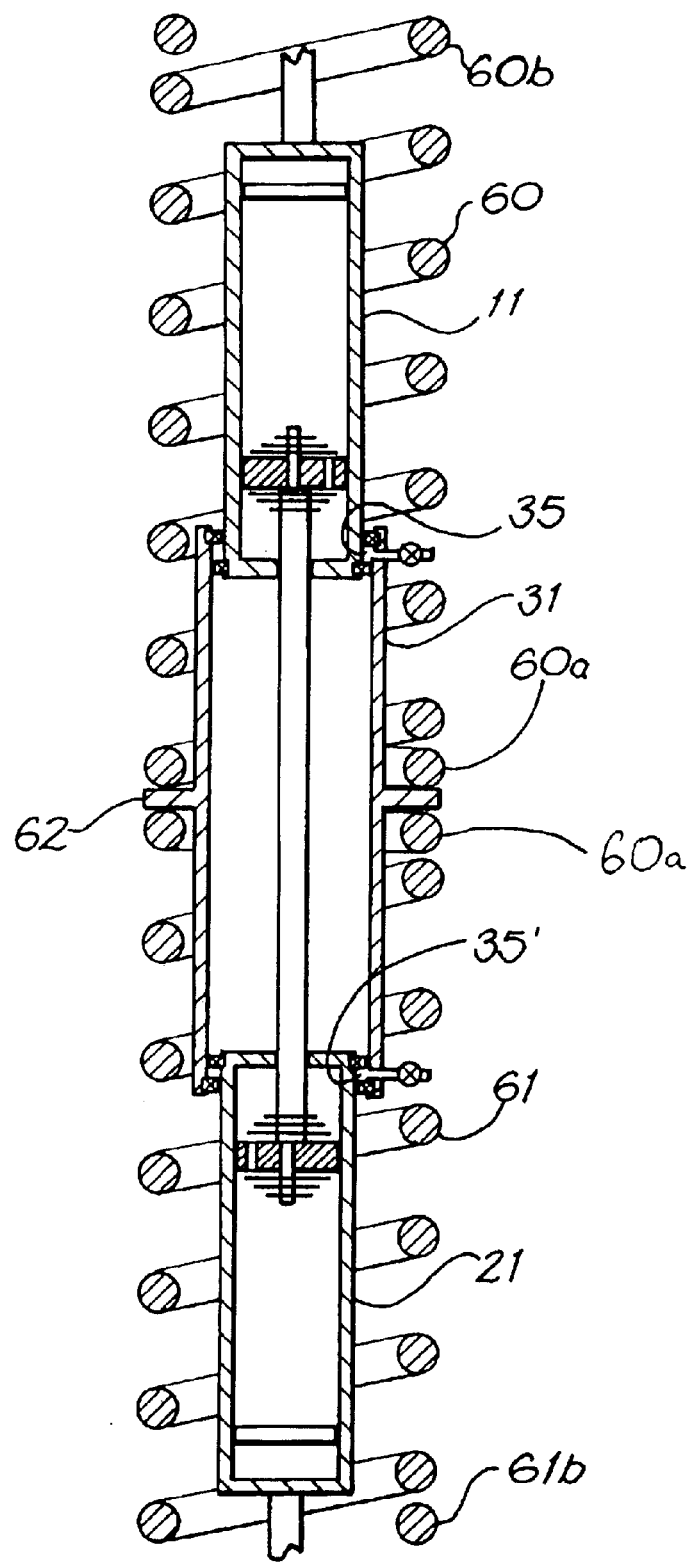
FIG. 17a is a sectional front elevational view of a modified form of the shock absorber of FIG. 16 in an extended state.

The shock absorber of FIGS. 16 and 17 is depicted with two coil springs 60, 61 in FIG. 17a. The coil spring first ends 60a, 61a are fixed with respect to the sleeve 31 by way of an annular end plate 62 fixed to the sleeve 31.

Figure 18:
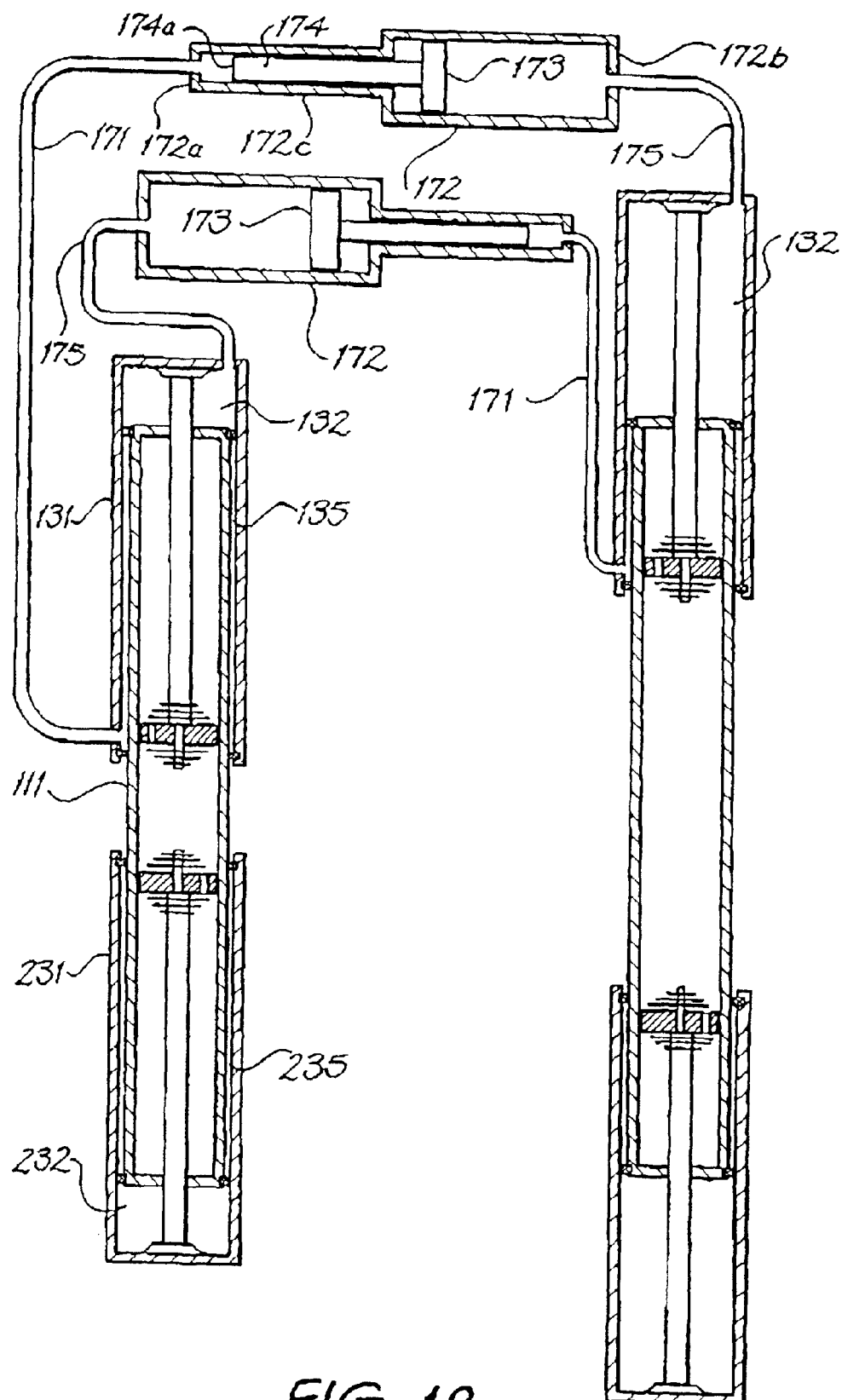
FIG. 18 is a sectional front elevation view of two operatively associated shock absorbers according to FIG. 12.

The shock absorbers providing sealed sleeve cavities and sealed annular cavities, as depicted in FIGS. 12 to 17, can be communicated to balance the overall suspension of a vehicle. FIG. 18 depicts two shock absorbers according to FIG. 12 communicated in such a way. The first sealed annular cavities 132 of each shock absorber are filled with liquid (typically oil), rather than gas as per the annular cavities of the stand-alone shock absorbers. There is no thus no need to provide gas pressure adjustment valves for the annular cavities. The first sealed annular cavity 132 of each shock absorber is operatively associated with the first sleeve cavity 135 of the other shock absorber such that an increase in the volume of the first sealed annular cavity 132 provides a reduction in gas pressure in the first sleeve cavity 135 of the other shock absorber. Conversely a decrease in volume of the first sealed annular cavity 132 of one shock absorber will provide an increase in gas pressure in the first sleeve cavity 135 of the other shock absorber.

To provide the above operative association the first sealed annular cavity 135 of one shock absorber communicates via a conduit 171 with a first end 172a of a control cylinder 172 and the first sleeve cavity 132 of the other shock absorber communicates via a conduit 175 with a second end 172b of the control cylinder 172. A control cylinder dividing piston 173 is disposed within the control cylinder 172 and isolates the associated first sealed annular cavity 135 and first sleeve cavity 132. The control cylinder dividing piston 173 is provided with a piston rod 174 which is housed in a reduced cross section tubular portion 172c of the control cylinder 172 toward the control cylinder first end 172a. The piston rod 174 and tubular portion 172c are sized such that the piston rod 174 seals the tubular portion 172c and the extending end 174a of the piston rod 174 consequently isolates the first sealed annular cavity 135 from the main chamber of the control cylinder housing the piston 173.

Operation of this arrangement will now be explained in relation to a cornering motor vehicle when the shock absorber on the left is compressed and the shock absorber on the right expands, as depicted in FIG. 18. Expansion of the right shock absorber will reduce the volume of the first annular cavity of the right shock absorber, causing liquid in the first annular cavity 135 of the right shock absorber to be forced out of the first annular cavity 135 through the conduit 171 where it will apply a pressure on the relatively small area of the extended end 174a of the associated piston rod 174. This pressure will act to push the piston rod 174 against the gas on the opposing side of the piston 173 in the main chamber of the control cylinder 172, increasing the pressure of this gas which is communicating with the first sleeve cavity 132 of the shock absorber on the left. This increase in pressure in the first sleeve cavity will in turn act to expand the shock absorber on the left, helping to restore it to its original position. Similarly compression of the left shock absorber will draw liquid into its expanding first annular cavity 135, drawing with it the associated piston rod 174 and reducing the gas pressure in the control cylinder main chamber and in the first sleeve cavity 132 of the right shock absorber. This reduction in pressure will act to compress the right shock absorber toward its original position. The interaction between the two shock absorbers on opposing sides of the vehicle will hence help to keep the vehicle level. The second sleeve cavity 232 and second annular cavity 235 can also be associated in the same way.

This arrangement can be used to associate the four shock absorbers of a motor vehicle in various ways. The front left and right shock absorber can be linked, with the rear left and right shock absorbers being linked independently. Alternatively the front left could be linked to the right rear, with the front right linked to the left rear. Provision of linkage at the first and second ends of the shock absorbers will enable a more complex network of linkages.

The balancing or levelling effect of the linkage between shock absorbers can be varied in magnitude by varying the relative area between the piston rod external end and the main piston area on which the gas acts.

Each of the shock absorbers of FIGS. 14 to 17 can also be operatively associated in the above manner, communicating the various sleeve cavities with the liquid filled annular cavity/ies of another shock absorber.

Figure 19:
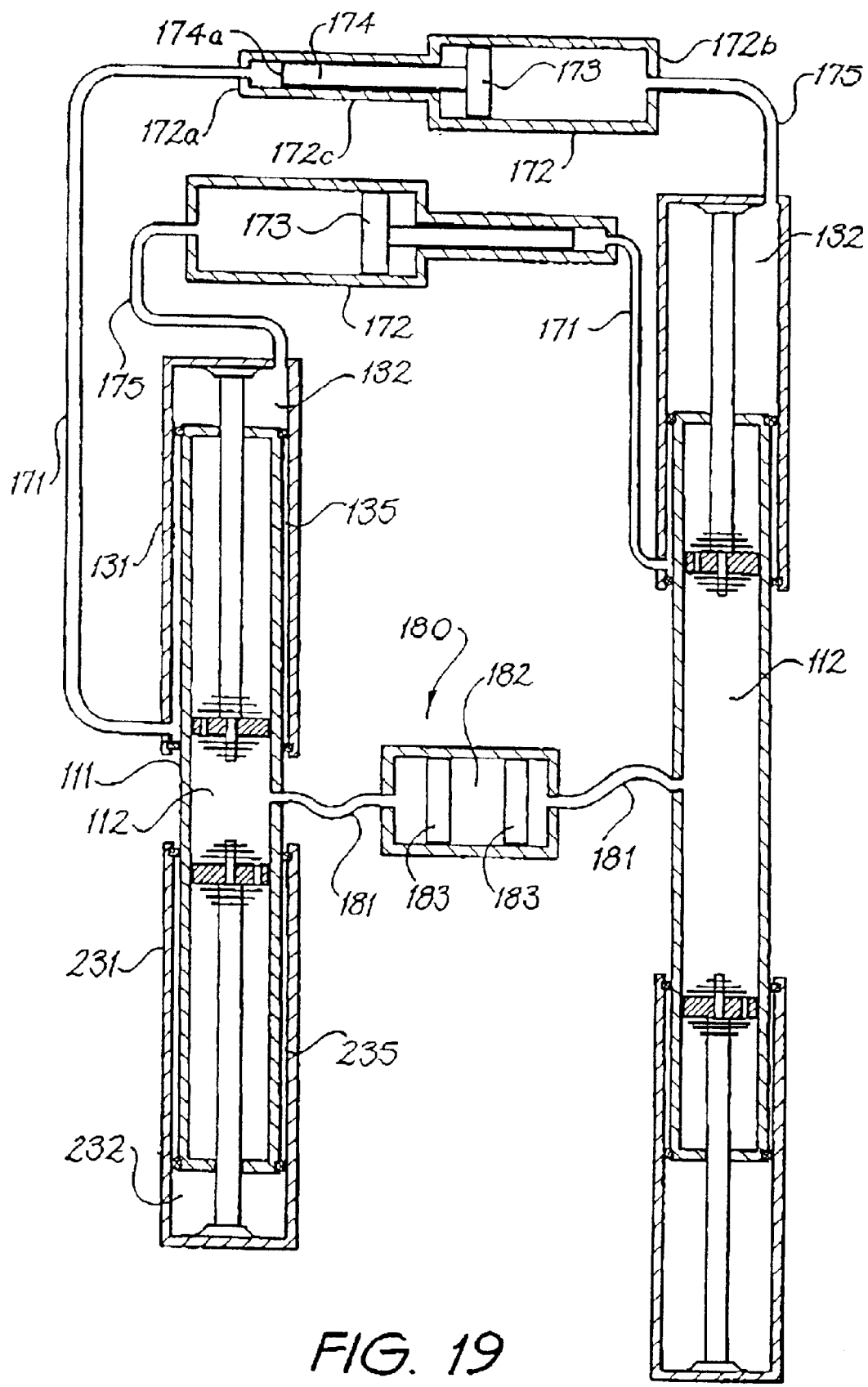
FIG. 19 is a sectional front elevation view of an arrangement similar to that of FIG. 18.

FIG. 19 depicts the arrangement of FIG. 18, with the piston chambers 112 of the left and right shock absorbers being associated via a gas cylinder 180. The piston chambers 112 communicate with opposing ends of the gas cylinder 180 via conduits 181. A gas chamber 182 is defined between two dividing pistons 183 housed in the gas cylinder 180. The gas cylinder 180 acts to compensate for extension of the pistons rods into the piston chambers 112 of each shock absorber and soften the action of the shock absorber as discussed above.

Figure 20:
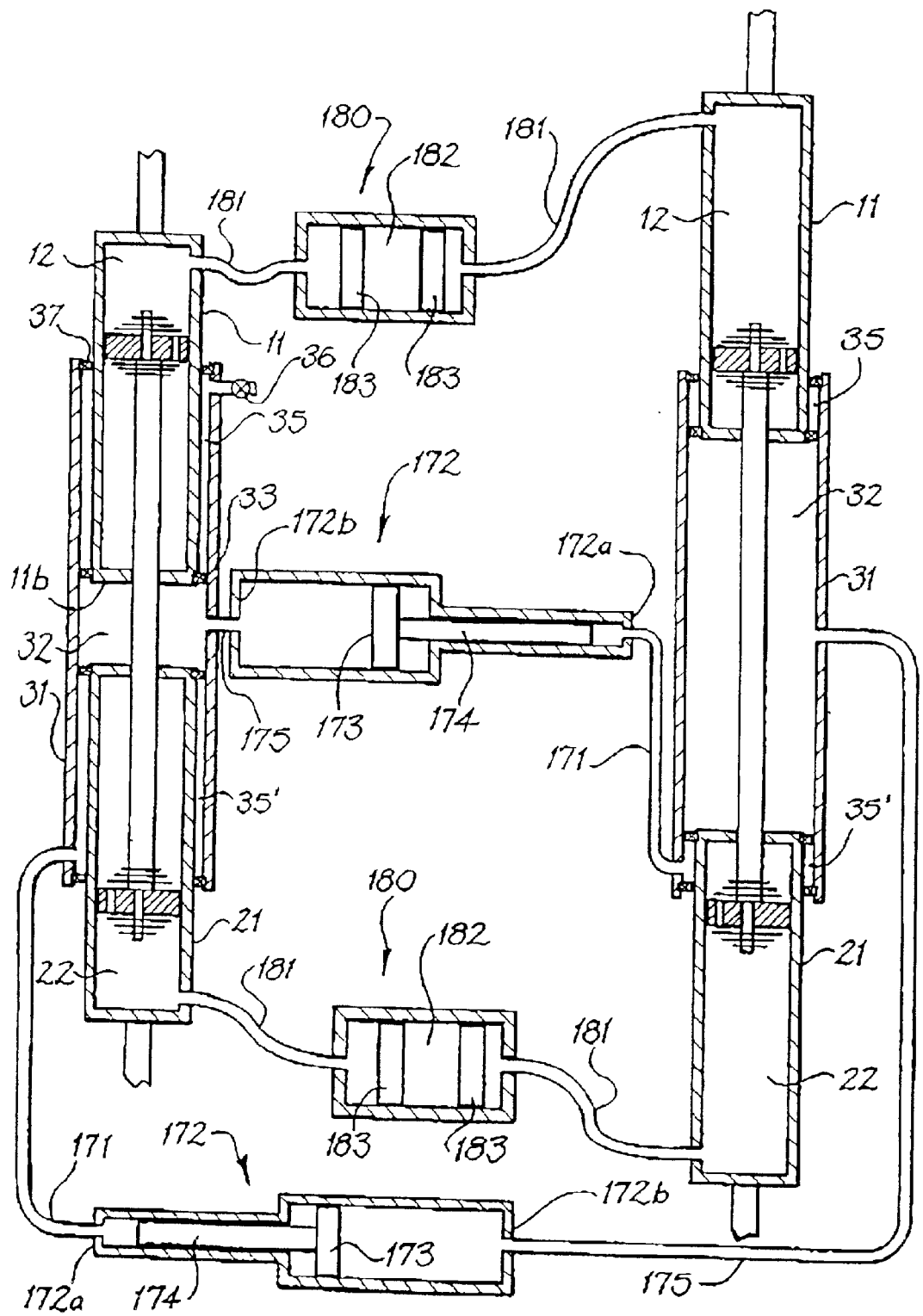
FIG. 20 is a sectional front elevation view of an arrangement similar to that of FIG. 19 but utilising two shock absorbers according to FIG. 16.

FIG. 20 depicts an arrangement equivalent o that of FIG. 19 utilising two twin cylinder, single piston rod sleeved shock absorbers as per FIGS. 16 and 17. Gas cylinders 180 associate the corresponding piston chambers 12, 22 of tie left and right shock absorbers as discussed above. The sleeve cavity 32 of each shock absorber is associated with either or both of the first and second sealed annular cavities 35, 35' of the other shock absorber by a control cylinder 172 as discussed above in relation to the arrangement of FIG. 18. The annular cavities so associated will be filled with liquid rather than gas. The annular cavity 35 or 35' communicates with the first end 172a of the control cylinder 172 via a conduit 171, whilst the sleeve cavity 32 communicates with the second end 172b of the control cylinder 172 via a conduit 175. The control cylinders 172 are provided with the same piston 173 and piston rod arrangement 174 as described above.

Operation of this arrangement is generally as per that of FIG. 18. Expansion of the right shock absorber during cornering will force liquid from the annular cavity 35' into the control cylinder 172, and thereby increase the pressure in the sleeve cavity 32 of the left shock absorber, tending to expand the compressed left shock absorber. Similarly, compression of the left shock absorber as a result of the cornering will draw liquid into its annular cavity 35' from the associated control cylinder 172, and thereby decrease the pressure in the sleeve cavity 32 of the right shock absorber, tending to compress the expanded right shock absorber.

As discussed above, during extension and compression of any shock absorber, axial displacement of the piston(s) within the piston(s) chamber will result in the piston rod(s) extending into and retracting from the piston chamber(s), varying the available volume of the piston chamber(s) for the liquid therein. The shock absorbers depicted in FIGS. 21 through 26 provide another alternate means of compensating for this variation in volume of the piston chamber(s) utilizing several of the shock absorber arrangements described herein.

Figure 21:
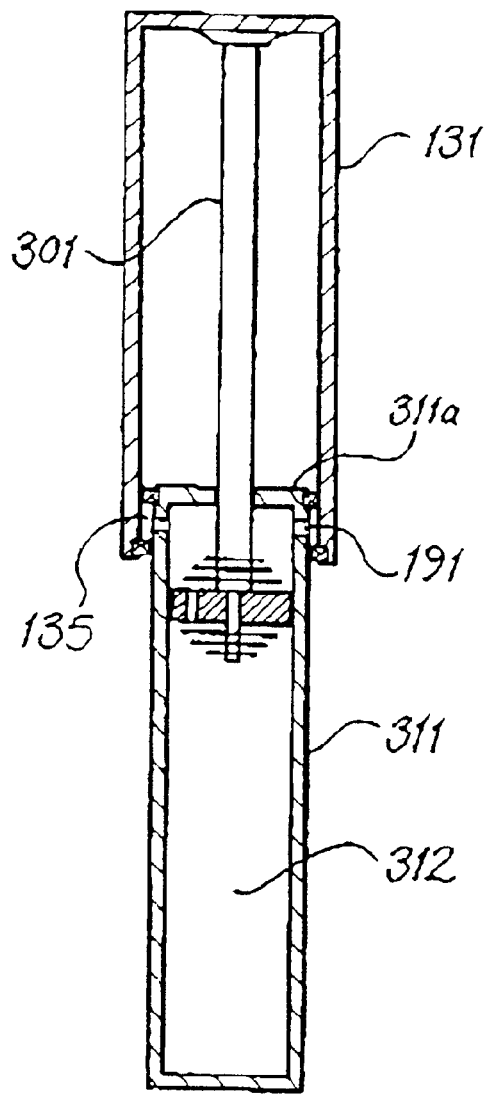
FIG. 21 is a sectional front elevation view of a modified form of the shock absorber of FIG. 14 in an extended state.
Figure 22:
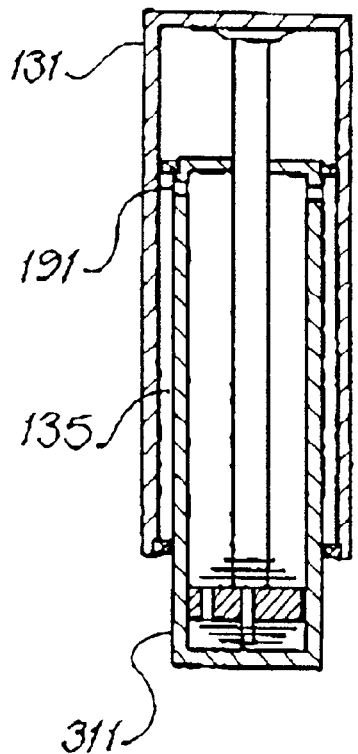
FIG. 22 is a sectional front elevation view of the shock absorber of FIG. 21 in a compressed state.

FIGS. 21 and 22 depict a shock absorber similar to that of FIGS. 14 and 15 but utilising the alternate compensation means. In this embodiment, rather than sealing and pressurising the annular cavity 135 defined in the overlap region between the sleeve 131 and cylinder 311, the annular cavity 135 is communicated with the piston chamber 312 via apertures 191 disposed adjacent the cylinder first end 311a. Oil fills both the piston chamber 312 and the annular cavity 135. The cross-sectional area of the annular cavity 135, as measured in a plane perpendicular to the longitudinal axis of the piston rod 301, is substantially equal to the cross sectional art of the piston rod 301. With this configuration, as the shock absorber is compressed and the piston rod 301 extends into the piston chamber 312, the reduction in volume of the piston chamber 312 is substantially identical to the increase in volume of the annular cavity 135, such that oil displaced by the piston rod 301 in the piston chamber 312 is accommodated by the increased volume of the annular cavity 135.

Figure 22A:
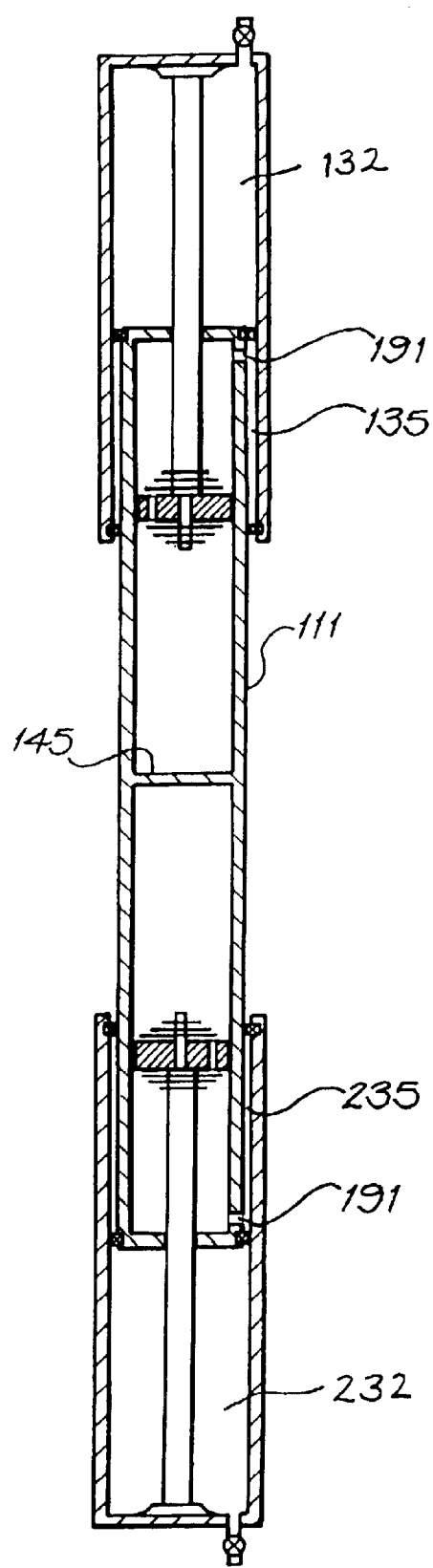
FIG. 22a is a sectional front elevational view of a modified form of the shock absorber of FIG. 12 in an extended state.

This configuration could also be applied to the twin piston rod configuration of FIGS. 12 and 13, with both the first and second annular cavities 135, 235 communicating with the respective piston sub-chambers 132, 232 through apertures 191. Such a configuration is depicted in FIG. 22a.

Utilizing the annular cavity volume change to accommodate oil displaced by the piston rod avoids the requirement for a separate compressible gas chamber separated from the piston chamber by a dividing piston as described above. The absence of the pressurised gas chamber also avoids pressurisation of the hydraulic fluid or oil filling the piston chamber. Cavitation and aeration is also effectively eliminated.

The shock absorber configuration of FIGS. 16 and 17 can be modified in a similar manner to accommodate oil displaced by the piston rod. Such a modified shock absorber is depicted in FIGS. 23 and 24. Again here the first and second annular cavities 35, 35' communicate with the first and second piston chambers 12, 22 via apertures 191 adjacent the first and second cylinder second ends 11b, 21b respectively. Again the cross sectional area of the annular cavities 35, 35' are substantially equal to the cross sectional area of the piston rod 1.

Figure 25:
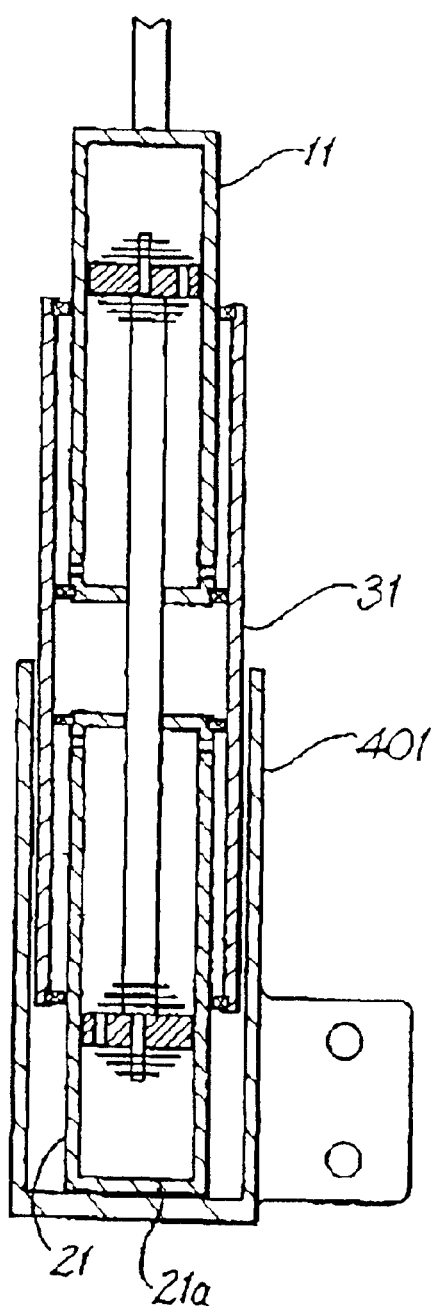
FIG. 25 is a sectional front elevation view of a McPherson type version of the shock absorber of FIG. 23 in a compressed state.
Figure 26:
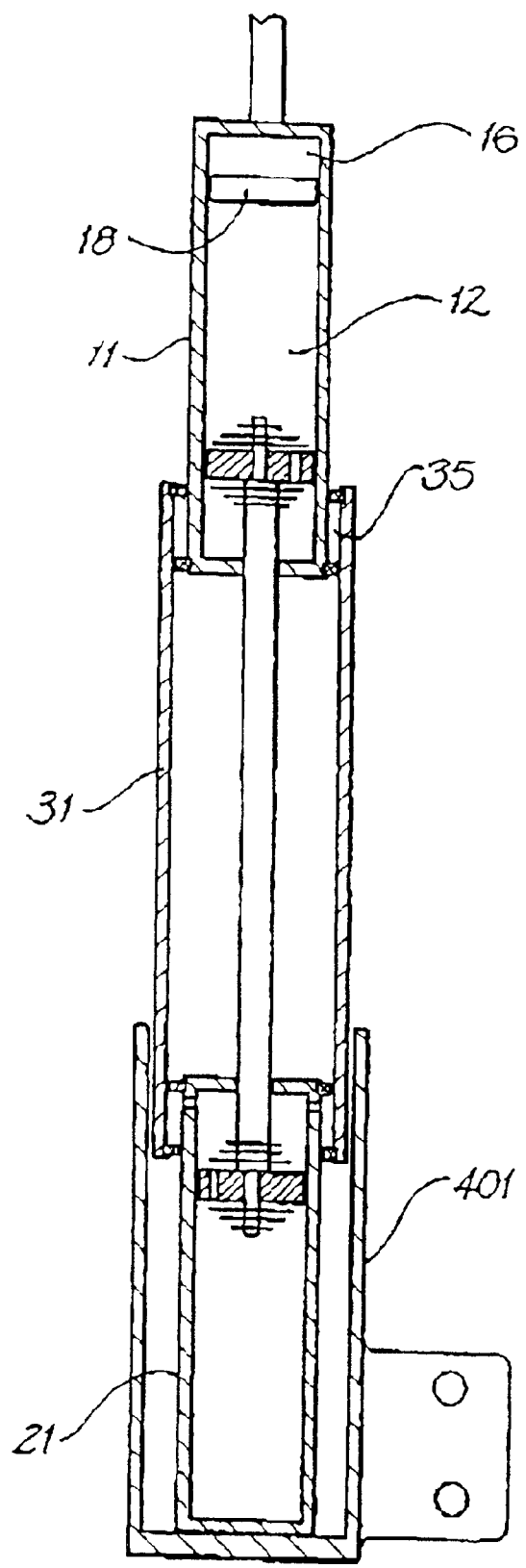
FIG. 26 is a sectional front elevation view of a shock absorber similar to that of FIG. 25 in an extended state.

The various embodiments of the present invention are applicable to McPherson strut type shock absorbers, with particular examples being depicted in FIGS. 25 and 26. The embodiment of FIG. 25 is identical to that of FIG. 22, with the second cylinder first end 21a being secured to the leg 401 of the McPherson strut with the sleeve 31 of the shock absorber being longitudinally displaceable within the McPherson strut leg 401.

Another possible variation is depicted in FIG. 26, which is identical to the shock absorber of FIG. 25 expect that the first cylinder 11 and annular cavity 35 are arranged as pet the embodiment of FIG. 16 and 17 without an aperture communicating the annular cavity 35 and first piston chamber. Accordingly, to provide for displacement of the piston rod 1 into the first piston chamber 12, a dividing piston 18 is provided in the first cylinder 11 separating the first piston chamber 12 from a gas chamber 16 in the usual manner.

Various other variations and combinations of features of the shock absorbers described will be apparent to the person skilled in the art.

I claim:

1. A shock absorber comprising:
   a first cylinder having a liquid filled first piston chamber, said first piston chamber being sealed from the atmosphere;
   a first piston received in said first piston chamber, said first piston being axially displaceable through said first piston chamber;
   a first dampener providing for dampened axial displacement of said first piston through said first piston chamber;
   a second cylinder having a liquid filled second piston chamber, said second piston chamber being sealed from the atmosphere, said second cylinder being axially aligned with said first cylinder, said first and second cylinders being mutually axially displaceable;
   a second piston received in said second piston chamber, said second piston being axially displaceable through said second piston chamber;
   a second dampener providing for dampened axial displacement of said second piston through said second piston chamber;
   a piston rod axially extending between and into said first and second piston chambers, first and second axial ends of said piston rod being connected to said first and second pistons, respectively; and
   mountings for securing said first and second cylinders to a body and wheel suspension of a vehicle, respectively.

2. The shock absorber of claim 1 further comprising:
   a sealed fist gas chamber located within said first cylinder at an end thereof distal to said piston rod; and a first dividing piston received in said first cylinder, said fist dividing piston separating said first piston chamber and said first gas chamber, said first dividing piston being axially displaceable within said first cylinder.

3. The shock absorber of claim 2 wherein said first gas chamber is operatively associated with a valve for adjusting gas pressure in said first chamber.

4. The shock absorber of claim 2 further comprising:

a sealed second gas chamber located within said second cylinder at an end thereof distal to said piston rod; and a second dividing piston received in said second cylinder, said second dividing piston separating said second piston chamber and said gas chamber, said second dividing piston being axially displaceable within said second cylinder.

5. The shock absorber of claim 4 wherein said gas chamber is operatively associated with a valve for adjusting gas pressure in said second gas chamber.

6. The shock absorber of claim 1 further comprising:

a third cylinder;

a third piston received in said third cylinder, said third cylinder being axially displaceable through said third cylinder; said third piston dividing said third cylinder into a first sub-chamber and a second sub-chamber; and a first conduit communicating said first piston chamber with said first sub-chamber; wherein said second sub-chamber contains a gas.

7. The shock absorber of claim 1 wherein said shock absorber further comprises a sleeve extending between said first and second cylinders, said sleeve sealingly engaging said first and second cylinders so as to define a sleeve cavity therebetween, said sleeve being telescopically displaceable with respect to at least one of said first and second cylinders to allow for relative axial displacement of said fist and second cylinders.

8. The shock absorber of claim 7 wherein said sleeve is provided with a valve means for adjusting gas pressure within said sleeve cavity.

9. The shock absorber of claim 7 wherein said sleeve is axially displaceable with respect to both of said first and second cylinders.

10. The shock absorber of claim 7 wherein a first annular cavity is defined in an overlap region between said first cylinder and said sleeve, opposing axial ends of said first annular cavity being respectively defined by a first seal fixed to said first cylinder and sealingly engaging said sleeve a second seal fixed to said sleeve and sealingly engaging said first cylinder.

11. The shock absorber of claim 10 wherein said first annular cavity communicates with said first piston chamber, a cross-sectional area of said first annular cavity measured in a plane perpendicular to a longitudinal axis of said piston rod being substantially equal to a cross sectional area of said piston rod.

12. The shock absorber of claim 10 wherein said first annular cavity is provided with a valve for adjusting gas pressure therein.

13. The shock absorber of claim 10 wherein a second annular cavity is defined in an overlap region between said second cylinder and said sleeve, opposing axial ends of said second annular cavity being respectively defined by a first seal fixed to said second cylinder and sealingly engaging said sleeve and a second seal fixed to said sleeve and sealingly engaging said second cylinder.

14. The shock absorber of claim 13 wherein said second annular cavity communicates with said second piston chamber, a cross-sectional area of said second annular cavity measured in a plane perpendicular to a longitudinal axis of said piston rod being substantially equal to a cross sectional area of said piston rod.

15. The shock absorber of claim 13 wherein said second annular cavity is provided with a valve for adjusting gas pressure therein.

16. The shock absorber of claim 7 further comprising first and second coil springs, said first coil spring being associated with said first cylinder and having a first end axially fixed with respect to said sleeve and a second end axially fixed with respect to said first cylinder, said second coil spring being associated with said second cylinder and having a first end axially fixed with respect to sleeve and a second end axially fixed with respect to said second cylinder.

17. The shock absorber of claim 16 wherein said first and second coil spring first ends are axially fixed with respect to said sleeve by of an annular end plate fixed to said sleeve between said first and second cylinders.

18. In combination, a first shock absorber according to claim 10 and a second shock absorber according to claim 10, wherein said first annular cavity of said first shock absorber is filled with liquid and is operatively associated with said sleeve cavity of said second shock absorber such that a decrease/increase in the volume of said first annular cavity of said first shock absorber provides an increase/decrease in gas pressure in said sleeve cavity of said second shock absorber.

19. The combination of claim 18 wherein said first annular cavity of said first shock absorber communicates with a first end of a control cylinder and said sleeve cavity of said second shock absorber communicates with a second end of said control cylinder, a control cylinder dividing piston being disposed within said control cylinder isolating said first annular cavity of said first shock absorber and said sleeve cavity of said second shock absorber.

20. The combination of claim 19 wherein said control cylinder dividing piston is provided with a piston rod sealingly received in a reduced cross section portion of said control cylinder toward said control cylinder first end such that an extending end of said piston rod isolates said first annular cavity of said first shock absorber.

21. The combination of claim 18 wherein the first annular cavity of said second shock absorber is filled with liquid and is operatively associated with said sleeve cavity of said first shock absorber such that a decrease/increase in the volume of said first annular cavity of said second shock absorber provides an increase/decrease in gas pressure in said sleeve cavity of said first shock absorber.

22. The shock absorber of claim 6 wherein said second sub-chamber is operatively associated with a valve for adjusting gas pressure in said second sub-chamber.

23. The shock absorber of claim 6 further comprising:

a fourth cylinder;

a fourth piston received in said fourth cylinder, said fourth piston being axially displaceable through said fourth cylinder; said fourth piston dividing said fourth cylinder into a third sub-chamber and a fourth sub-chamber; and a second conduit communicating said second piston chamber with said third sub-chamber; wherein said fourth sub-chamber contains a gas.

24. The shock absorber of claim 23 wherein said fourth sub-chamber is operatively associated with a valve for adjusting gas pressure in said fourth sub-chamber.

25. The shock absorber of claim 1 further comprising first and second coil springs, said first coil spring being associated with said first cylinder and having a first end axially fixed with respect to said piston rod and a second end axially fixed with respect to said first cylinder, said second coil spring being associated with said second cylinder and having a first end axially fixed with respect to said piston rod and a second end axially fixed with respect to said second cylinder.

26. The shock absorber of claim 25 wherein said first and second coil spring first ends are axially fixed with respect to said piston rod by means of an annular end plate fixed to said piston rod between first and second cylinders.

* * * * *